(12) United States Patent
Franzino

(10) Patent No.: US 11,242,888 B2
(45) Date of Patent: Feb. 8, 2022

(54) DRIVE SHAFT COUPLING

(71) Applicant: Crossford International, LLC, Stamford, CT (US)

(72) Inventor: Joseph J. Franzino, Redding, CT (US)

(73) Assignee: Crossford International, LLC, Stamford, CT (US)

( * ) Notice: Subject to any disclaimer, the term of this patent is extended or adjusted under 35 U.S.C. 154(b) by 961 days.

(21) Appl. No.: 15/961,168

(22) Filed: Apr. 24, 2018

(65) Prior Publication Data

US 2018/0238395 A1 Aug. 23, 2018

Related U.S. Application Data

(62) Division of application No. 15/403,270, filed on Jan. 11, 2017, now Pat. No. 9,951,821.

(51) Int. Cl.
| | |
|---|---|
| *F16C 1/06* | (2006.01) |
| *F16D 1/08* | (2006.01) |
| *B08B 9/032* | (2006.01) |
| *B08B 9/043* | (2006.01) |
| *B08B 9/047* | (2006.01) |

(52) U.S. Cl.
CPC ............... *F16C 1/06* (2013.01); *F16D 1/08* (2013.01); *B08B 9/0321* (2013.01); *B08B 9/047* (2013.01); *B08B 9/0436* (2013.01); *Y10T 403/581* (2015.01)

(58) Field of Classification Search
CPC ........ B08B 9/032; B08B 9/0321; B08B 9/04; B08B 9/043; B08B 9/0436; B08B 9/047; F16B 2/10; F16B 7/0426; F16C 1/06; F16C 1/08; F16D 1/033; F16D 1/04; F16D 1/05; F16D 1/076; F16D 1/08; F16L 37/0796; F28G 3/16; Y10T 24/44376; Y10T 24/44385; Y10T 403/581; Y10T 403/583; Y10T 403/587; Y10T 403/589
USPC .......... 464/52, 170, 177, 901; 403/316, 317, 403/319, 320; 285/305, 320, 321, 921; 24/499, 500
See application file for complete search history.

(56) References Cited

U.S. PATENT DOCUMENTS

| | | |
|---|---|---|
| 787,333 A | 4/1905 | Hughes et al. |
| 1,855,257 A | 2/1932 | Lincoln |
| 1,853,359 A | 4/1932 | Kaiser |

(Continued)

FOREIGN PATENT DOCUMENTS

| | | | |
|---|---|---|---|
| EP | 0811797 | 9/2000 | |
| KR | 100555630 | 2/2006 | |
| WO | WO-9423236 A1 * | 10/1994 | ............ F16L 37/096 |

OTHER PUBLICATIONS

Hinged Shaft Collar is Suited for Non-Rotary Applications; dated Jul. 9, 2012 (http://news.thomasnet.com/fullstory/hinged-shaft-collar-is-suited-for-non-rotary-applications-618086) download date: Nov. 3, 2016; 4 pps.

(Continued)

*Primary Examiner* — Josh Skroupa
(74) *Attorney, Agent, or Firm* — Carson C. K. Fincham; RowanTree Law Group, PLLC

(57) ABSTRACT

A drive shaft coupling for connecting a rotating tube cleaning shaft to a tube cleaning machine wherein high pressure fluid is pumped through the coupling, wherein the coupling is sealed to contain the high pressure fluid, and wherein a machine driven rotary flexible shaft passes through the coupling.

11 Claims, 20 Drawing Sheets

(56) References Cited

U.S. PATENT DOCUMENTS

| | | | |
|---|---|---|---|
| 2,113,821 A | 4/1938 | Baash | |
| 2,352,019 A | 6/1944 | Schott | |
| 2,516,409 A | 7/1950 | Osterhoudt | |
| 3,195,934 A | 7/1965 | Parrish | |
| 3,210,962 A | 10/1965 | Birdwell | |
| 3,602,009 A | 8/1971 | Powell | |
| 3,700,112 A * | 10/1972 | Maeshiba | F16L 37/096 |
| | | | 285/317 |
| 4,040,757 A | 8/1977 | Pauli | |
| 4,392,836 A | 7/1983 | Sugawara | |
| 4,453,289 A | 6/1984 | Kleycamp et al. | |
| 4,547,953 A | 10/1985 | Livolsi | |
| 4,802,694 A | 2/1989 | Vargo | |
| 5,079,808 A | 1/1992 | Brown | |
| 5,199,724 A | 4/1993 | Meltsch et al. | |
| 5,251,940 A | 10/1993 | Demoss et al. | |
| 5,316,033 A | 5/1994 | Schumacher et al. | |
| 5,335,388 A | 8/1994 | Salecker | |
| 5,350,200 A | 9/1994 | Peterson et al. | |
| 5,490,693 A | 2/1996 | Fisher et al. | |
| 5,509,702 A | 4/1996 | Warehime et al. | |
| 5,518,278 A | 5/1996 | Sampson | |
| 5,816,298 A | 10/1998 | Strickin et al. | |
| 6,053,540 A | 4/2000 | Meyer | |
| 6,264,360 B1 | 7/2001 | Lehmusvaara et al. | |
| 6,685,237 B1 | 2/2004 | Robinson | |
| 6,821,048 B2 | 11/2004 | Talesky | |
| 6,837,645 B2 | 1/2005 | Kanatani | |
| 6,994,130 B1 | 2/2006 | Gabbey et al. | |
| 7,156,424 B2 | 1/2007 | Mccord | |
| 7,559,125 B2 | 7/2009 | Cofer | |
| 7,758,087 B2 | 7/2010 | Niven et al. | |
| 7,992,579 B2 | 8/2011 | Longoria | |
| 8,240,718 B2 * | 8/2012 | Morton | F16L 23/036 |
| | | | 285/320 |
| 8,328,242 B2 * | 12/2012 | Guidry | E21B 17/046 |
| | | | 285/321 |
| 8,539,995 B2 | 9/2013 | Smith et al. | |
| 8,746,532 B2 | 6/2014 | Nalagatla et al. | |
| 8,763,214 B2 | 7/2014 | Yang | |
| 8,945,089 B2 | 2/2015 | Johnson et al. | |
| 9,011,255 B1 | 4/2015 | Franzino et al. | |
| 9,364,076 B2 | 6/2016 | Mauffette et al. | |
| 9,366,297 B2 * | 6/2016 | Hause | F16C 1/08 |
| 9,383,047 B2 | 7/2016 | Alexander et al. | |
| 9,423,062 B2 * | 8/2016 | Steele | F16L 37/107 |
| 2004/0172795 A1 | 9/2004 | Cheng | |
| 2006/0021203 A1 | 2/2006 | Nails | |
| 2009/0230675 A1 | 9/2009 | Densmore | |
| 2011/0101674 A1 | 5/2011 | Benvenuto et al. | |
| 2014/0033509 A1 | 2/2014 | Sidwell | |
| 2015/0164206 A1 | 6/2015 | Reed | |
| 2016/0252143 A1 | 9/2016 | Kato et al. | |

OTHER PUBLICATIONS

High Speed Motor OMM Hydraulic Wheel Drive,Process Machinery Machine Used BMM-40 OMM40 Small Hydraulic Drive Wheel Motor (https://www.alibaba.com/product-detail/High-Speed-Motor-OMM-Hydraulic-Wheel_60094292257.html) download date: Nov. 3, 2016; 20 pps.

Office Action for U.S. Appl. No. 15/403,270 dated Jun. 1, 2017; 14 pps.

Notice of Allowance for U.S. Appl. No. 15/403,270 dated Dec. 19, 2017; 8 pps.

* cited by examiner

DRIVE SHAFT COUPLING

CROSS-REFERENCE TO RELATED APPLICATIONS

The present application is a Divisional of, and claims benefit and priority under 35 U.S.C. § 120 to, U.S. patent application Ser. No. 15/403270 filed Jan. 11, 2017 and titled "DRIVE SHAFT COUPLING", which issued as U.S. Pat. No. 9,951,821 on Apr. 24, 2018, the entirety of which is hereby incorporated by reference herein.

BACKGROUND OF THE INVENTION

Air conditioning and industrial chilling systems are typically configured with arrays of chiller tubes. Boilers and other commercial or industrial equipment may also include fluid tubes to provide various heat exchange functionality. Such tubes must be serviced to prevent or reduce fouling and corrosion and such servicing typically involves utilization of both mechanical and fluid treatment on the interior surfaces of the tubes. The fluid treatment itself often includes application of chemical cleaners or inhibitors. In some cases, different tools may be utilized for each of the mechanical agitation, chemical application, and powered fluid cleaning or washing. While some tools available in the industry provided combined solutions that integrate mechanical agitation and powered fluid washing, such tools may suffer from various deficiencies. Some of these deficiencies relate to the coupling of a rotary tube cleaning drive shaft and tube cleaning fluid conduit to a tube cleaning machine. Several previous attempts at addressing coupling deficiencies are described below.

U.S. Pat. No. 5,251,940 (hereinafter "DeMoss") discloses a "pipe coupling [that] includes a pair of hub members and a pair of coupling members surrounding the hub members", as well as a "plurality of projections [that] extend outwardly from [one] coupling member and are received in receiving recesses in the other coupling member." DeMoss, Abstract. DeMoss also describes that "[r]elative rotation of the coupling members moves the projections behind locking flanges into a locking position [and a] pivotally mounted lever on each connecting member is received by a locking recess on the other connecting member when in the locking position." Id.

U.S. Pat. No. 6,821,048 (hereinafter "Talesky") discloses "[a] ferrule for coupling an attachment to a rotary hand tool unit of the type that has a housing with a nose portion through which a rotary output shaft extends." Talesky, Abstract. Talesky further describes that "[t]he nose portion has at least one groove extending generally circumferentially around at least a part of the nose portion, so that a groove portion is located on opposite sides of the nose portion [and that] [t]he ferrule includes a generally cylindrical body with interior and exterior surfaces with an open mounting end portion and a smaller opposite end portion to which the attachment is mounted." Id. Talesky further describes that "[t]he open mounting end portion fits on a nose portion of the housing when the ferrule is coupled to the rotary hand tool" and that "[t]he ferrule further includes at least one internally protruding rib on the interior surface for aligning the ferrule in a least one predetermined angular position, and at least two latches mounted on the ferrule," and where "each latch having an open and a closed position wherein the ferrule is locked into the nose portion when the latch is in the closed position." Id.

U.S. Pat. No. 8,746,532 (hereinafter "Nalagatla") discloses "[a] stapling reload assembly for a circular stapling instrument [that] includes a casing, a staple holder, a staple driver, and an anvil assembly." Nalagatla, Abstract. Nalagatla further describes that "[t]he staple holder is attached to the casing[,] and [t]he staple driver includes a driver alignment surface[,] [t]he staple driver is receivable within the casing and is configured to move within the casing from a pre-fired position to a fired position." Id. Nalagatla further describes that "[t]he anvil assembly includes an anvil base surface, an anvil alignment surface, and a staple forming surface[,] [and] [t]he anvil base surface is configured to move from an open position away from the casing to a closed position adjacent the casing." Id. Nalagatla further describes that "[t]he anvil alignment surface is configured to mate with the driver alignment surface, to rotationally align the staple forming surface with the staple holder, when the anvil base surface is in the closed position." Id.

U.S. Pat. No. 9,383,047 (hereinafter "Alexander") discloses "[a] locking device [with] a threaded pressure fitting having clamp members, [where] a clamping load is applied to the clamp members to clamp the clamp members to one another." Alexander, Abstract. Alexander further describes that "[e]ach clamp member has a first insert and a second insert held captive thereto, and each insert has a bearing face adapted to cooperate with and bear against part of the pressure fitting," where "at least the first insert associated with each of the clamp members is angularly moveable relative thereto to permit the bearing face of each first insert to be orientated differently to the bearing face of the associated second insert." Id.

SUMMARY OF THE INVENTION

To overcome some of the deficiencies of the prior art, what is needed is a quick connect coupling on a tube cleaning machine for directing a rotary tube cleaning drive shaft and tube cleaning fluid to a tube cleaning site, wherein the quick connect coupling includes a drive manifold assembly mounted on the tube cleaning machine having a first latch means mounted on the drive manifold assembly and second latch means cooperative with the first latch means to removably secure a driven shaft assembly to the drive manifold assembly. The driven shaft assembly and the drive manifold assembly have cooperating sealing means for confining the tube cleaning fluid to a flow path from the tube cleaning machine through the coupling.

Embodiments of the present invention are directed to a quick connect coupling on a tube cleaning machine for directing a rotary tube cleaning drive shaft and tube cleaning fluid to a tube cleaning site.

A drive manifold assembly mounted on the tube cleaning machine may have a first interior passage for flow of the tube cleaning fluid and for extension of a rotary drive shaft into the coupling. A first latch means may be mounted on the drive manifold assembly.

A driven shaft assembly removably connectable to the drive manifold assembly may have a second interior passage in communication with the first interior passage. A second latch means may cooperate with the first latch means to removably secure the driven shaft assembly to the drive manifold assembly. The driven shaft assembly and the drive manifold assembly may have cooperating sealing means for confining the tube cleaning fluid to a flow path from the tube cleaning machine through the coupling.

A drive shaft yoke assembly having a tubular body with a third interior passage may be coupled to and extend from the driven shaft assembly. A sheath may be secured to the inner surface of the yoke for encasing the rotary drive shaft and defining an interior channel for flow of tube cleaning fluid from the tube cleaning machine. The rotary drive shaft may extend from a proximal end at the interior of the tube cleaning machine through the first, second, and third interior passages of the drive manifold assembly, the driven shaft assembly, and the yoke and sheath, for rotating a tube cleaning brush positioned at the distal end of the shaft.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION OF THE INVENTION

I. Introduction

Figure 1:
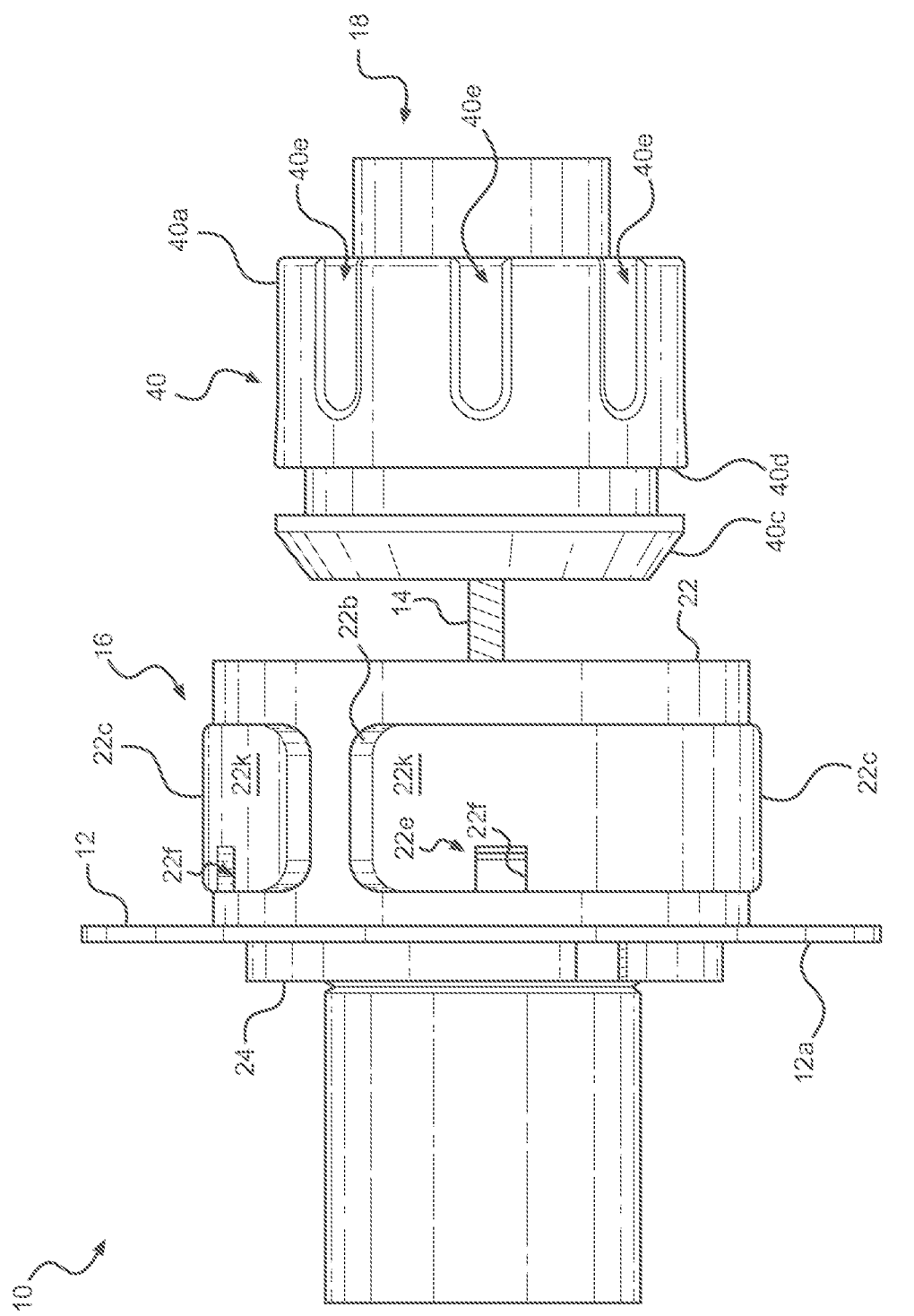
FIG. 1 is a side elevation view of a preferred embodiment of drive shaft coupling illustrating uncoupled drive manifold assembly and driven shaft assembly.

Embodiments described herein generally relate to a coupling for connecting a rotating tube cleaning shaft to a tube cleaning machine where high pressure fluid is pumped through the coupling, where the coupling is sealed to contain the high pressure fluid, and where a machine driven rotary flexible shaft passes through the coupling.

Some described embodiments have particular application with machines for cleaning the interior of heat exchanger tubes to maintain operational efficiency. Rotating brushes or other tools and flushing water are used for this kind of tube cleaning. A common type of heat exchanger has a bundle of tubes fixed at opposite ends in headers. Typically, untreated cooling water flows through the interior of the tubes and exchanges heat with water or some other fluid on the outside of the tubes which is at a different temperature than the water flowing on the inside of the tubes. As is well known, if the water flowing through the tubes is dirty or untreated or inadequately treated for minimizing precipitation of minerals, a mineral deposit and dirt will gradually accumulate on the inside of the tubes. Accumulated mineral and dirt in the tubes is removed by means of a tube cleaning machine propelling a rotating brush or other cleaning tool through each tube to dislodge mineral and dirt, and carrying dislodged material away in a flow of pressurized cleaning water.

In a tube cleaning machine of this kind, a cleaning tool such as a brush is mounted at an end of a rotatable shaft encased within a sheath, and cleaning fluid typically pressurized water passes through a sheath interior passage into the heat exchanger tube. Combined action of rotating tool and pressurized water accomplishes the desired tube cleaning in removing mineral deposits and dirt.

In this operational setting, there is need for a fluid tight drive shaft coupling for quickly and easily connecting the rotary shaft to the tube cleaning machine that provides rotary drive and pressurized water.

Embodiments described herein provide a tube cleaning machine housing mounting a drive motor for rotating a flexible tube cleaning shaft through a drive shaft coupling. The rotating tube cleaning shaft is manually connected to and driven through a coupling that passes through a machine housing side wall.

The coupling in accordance with some embodiments comprises a driver manifold assembly forming part of the machine housing, and a driven shaft assembly forming part of the rotary cleaning shaft. The coupling provides for quick attachment and release of its component assemblies. The coupling is sealed to withstand high pressure fluid pumped through the coupling during a tube cleaning operation from the driver manifold assembly into the driven shaft assembly.

The driver manifold assembly is affixed at an opening through the outer casing of the tube cleaning machine and comprises an inner duct defining a fluid passage that extends through the casing opening, and cooperates with a concentric, outer latching collar. The latching collar and a retainer ring positioned on opposite sides of the casing opening cooperate in securing the inner duct in fixed position in the casing opening. The latching collar, in turn, receives, retains and seals a driven shaft assembly in pressurized water tight assembly.

The driven shaft assembly comprises a connecting collar secured to the near end of elongate rotary shaft assembly of yoke, sheath, flexible drive shaft, and cleaning tool. The sheath defines an interior passage for both the flexible drive shaft and pressurized water. The driven shaft assembly together with the rotary shaft assembly connects to the driver manifold assembly and is retained there by latching collar, forms a water tight seal with the inner duct, and positions a rotary drive shaft clutch at the near end of the flexible shaft for engagement with rotary drive head within the tube cleaning machine housing.

In use, when coupling of driver manifold assembly and driven shaft assembly is made, rotary motion is received by the flexible drive shaft, pressurized water flows through the coupling into the interior of the drive shaft sheath, and a tube cleaning tool such as a spiral wound brush attached to the far end of the drive shaft is ready for tube cleaning. An operator places the tool at a tube entrance and begins tube cleaning.

Specific examples are included in the following description for purposes of clarity, but various details can be changed within the scope of the embodiments described herein.

II. Drive Shaft Coupling

The drive shaft coupling in accordance with some embodiments is for use in tube cleaning machines made and sold by the Applicant, particularly, RAM™ tube cleaners having a power console or housing mounted on a hand truck. The console connects to the near end of an elongate flexible drive shaft for rotating a tube cleaning brush or tool mounted at the far end of the flexible shaft. A sheath encasing the drive shaft defines an interior channel for passage of cleaning fluid from the power console to the brush end of the sheath. In a tube cleaning pass, the rotating tool and cleaning fluid advance through a tube interior to remove and flush away dirt and encrusted mineral.

Figure 8:
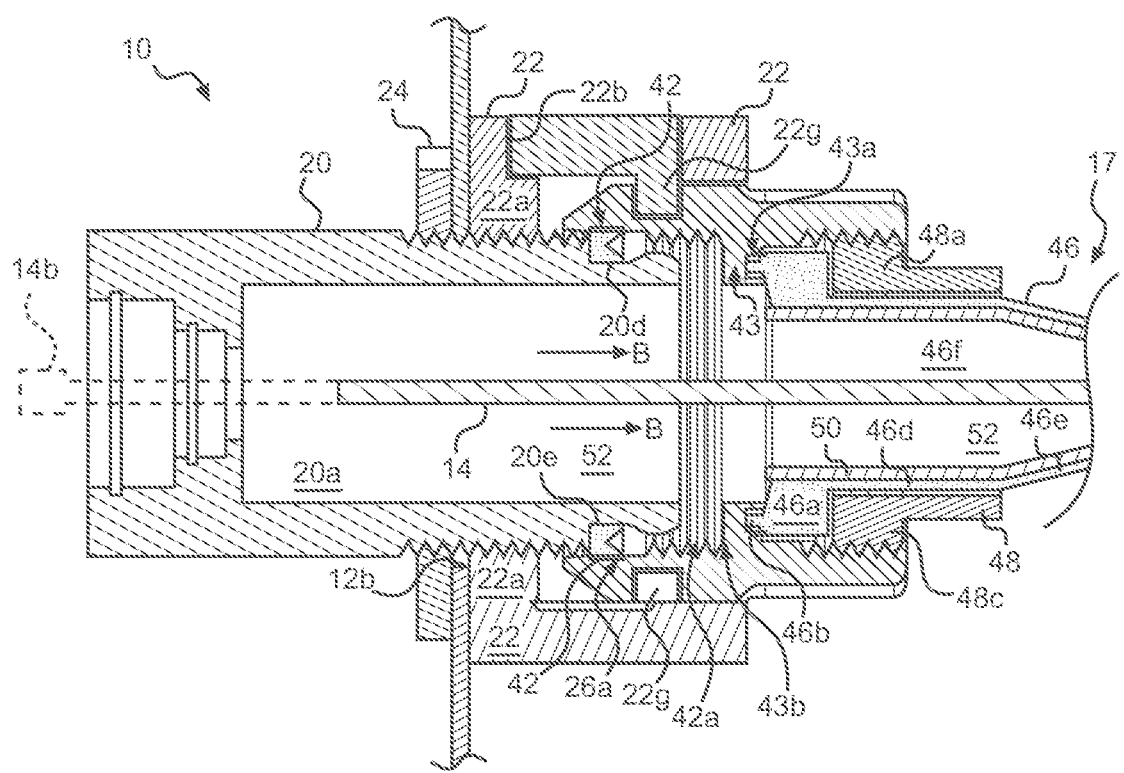
FIG. 8 is a side elevation view in section of drive shaft coupling of FIG. 1 illustrating interior layout of coupled drive manifold assembly and driven shaft assembly, together with tube cleaning subassembly of flexible drive shaft, yoke, and sheath in place.
Figure 11:
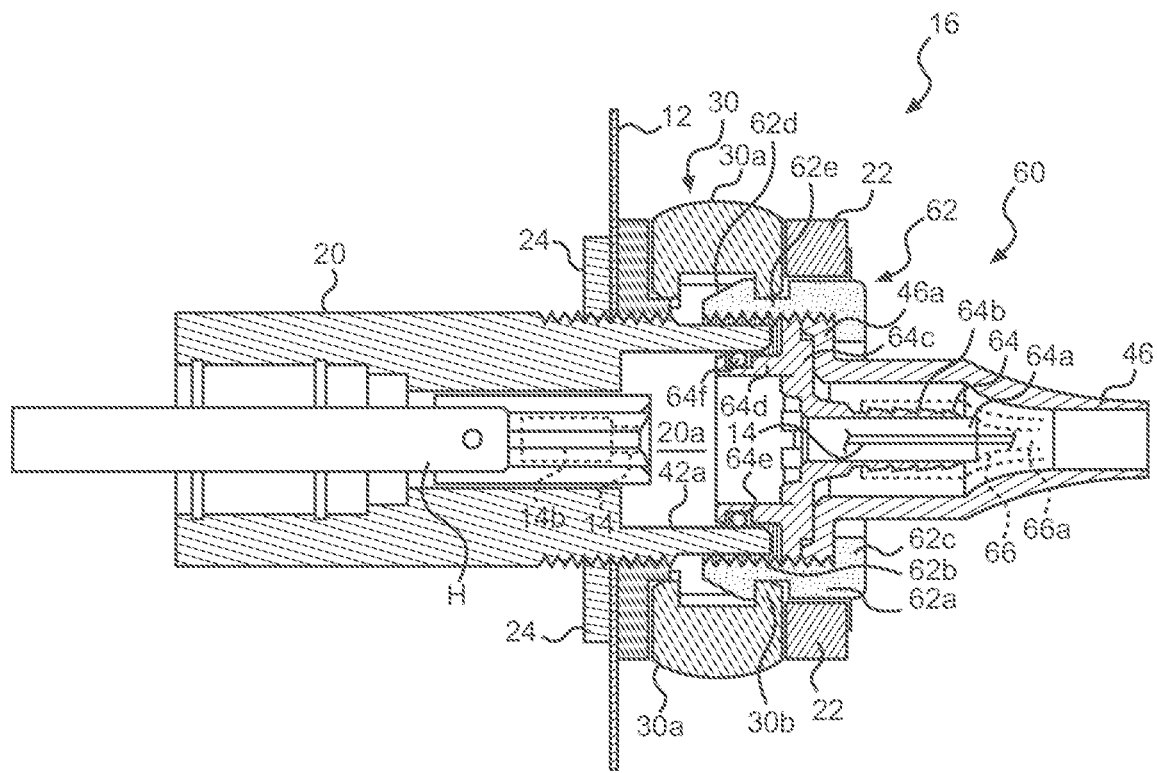
FIG. 11 is a side elevation view in section of drive shaft coupling of another preferred embodiment illustrating interior layout of coupled drive manifold assembly and driven shaft assembly, together with tube cleaning subassembly of flexible drive shaft, yoke, sheath in place and fluid tight sealing arrangement.
Figure 12:
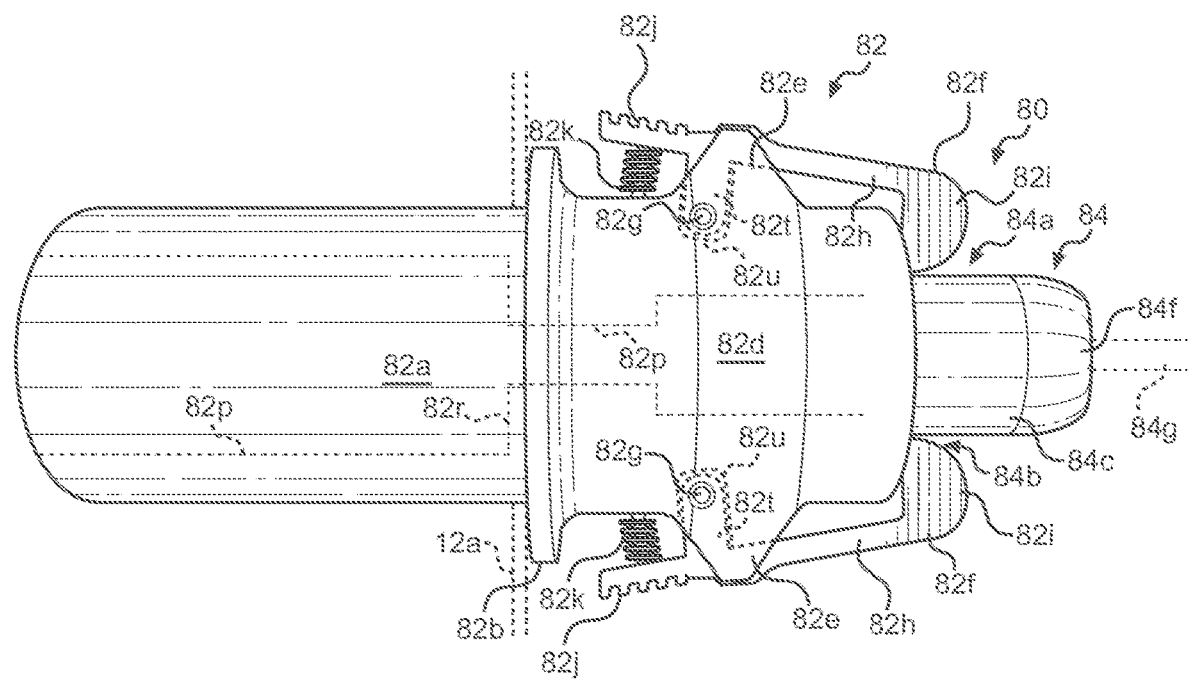
FIG. 12 is a side elevation view of drive shaft coupling of another preferred embodiment illustrating exterior layout of coupled drive manifold assembly and driven shaft assembly.
Figure 13:
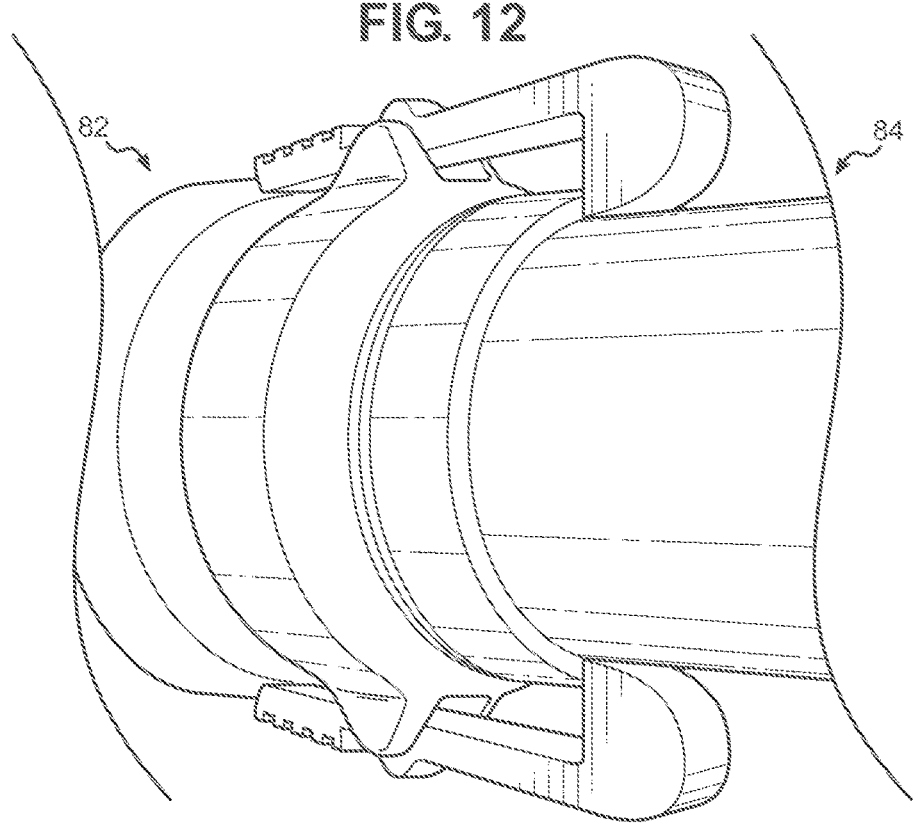
FIG. 13 is a perspective view of drive shaft coupling of FIG. 12 illustrating component action when drive manifold assembly and driven shaft assembly are coupled.
Figure 14:
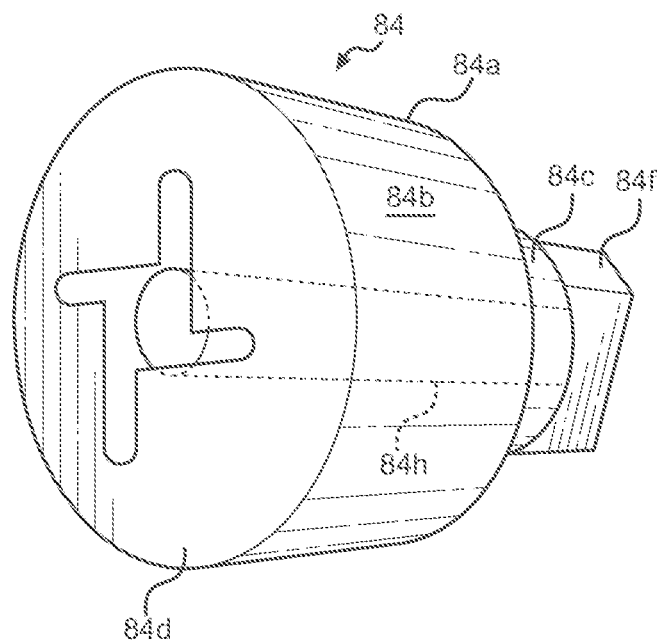
FIG. 14 is a perspective view of front face of driven shaft assembly of the coupling of FIG. 12.

Referring to FIG. 1 of the drawings, a shaft quick connect coupling 10 in accordance with some embodiments is mounted on a tube cleaning machine housing 12 having a drive motor with drive clutch (not shown) for rotating a tube cleaning shaft 14 by shaft drive bar 14b (shown in FIG. 8 and FIG. 11). The tube cleaning shaft 14 is part of a drive shaft assembly (not shown in FIG. 1) and is driven through the shaft quick connect coupling 10 that passes through a tube cleaning machine housing side wall 12a.

The shaft quick connect coupling 10 in accordance with some embodiments comprises a driver manifold assembly 16 attached to the tube cleaning machine housing 12, and a driven shaft assembly 18 attached to the tube cleaning shaft assembly 17 (FIG. 8) comprising yoke 46, sheath 50, tube cleaning shaft 14 (e.g., a flexible drive shaft), and a cleaning tool (not shown). The shaft quick connect coupling 10 provides for quick attachment and release of its component assemblies 16, 17, 18. The shaft quick connect coupling 10 is sealed to withstand high pressure fluid pumped from the tube cleaning machine (not shown, except for the tube cleaning machine housing 12 and the tube cleaning machine housing side wall 12a thereof) through the driver manifold assembly 16 into the driven shaft assembly 18 during a tube cleaning operation.

The driver manifold assembly 16 is affixed at a housing opening 12b through the tube cleaning machine housing 12 and comprises an inner duct 20 (FIG. 2 and FIG. 3) defining a common passage 20a through the housing opening 12b for pressurized tube cleaning fluid (not explicitly shown), and for passage of tube cleaning shaft 14 (FIG. 1 and FIG. 8) for connection to a console drive motor (not shown). The inner duct 20 is centered and secured in the casing opening 12b by the action of concentric outer latching collar 22 and retaining ring 24. The inner duct 20 is threaded (i.e., comprises threads 20b) along its outer surface for positioning retaining ring 24 against tube cleaning machine housing side wall 12a around housing opening 12b. The inner duct 20 near its open end 20c is provided with an annular groove 20d for positioning a seal 20e such as an O-ring or U-cup. The seal 20e engages a sealing surface 42 (FIG. 3, FIG. 4, and FIG. 8) of the driven shaft assembly 18 as described below. The concentric outer latching collar 22 is provided with inwardly directed flange 22a threaded onto inner duct 20 for tightening the driver manifold assembly 16 to the housing wall 12a.

Figure 2:
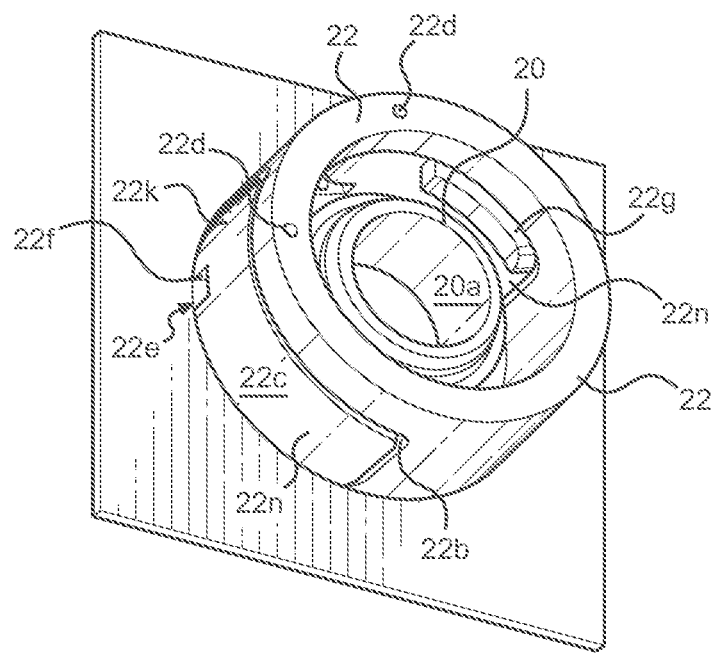
FIG. 2 is a perspective view of the drive manifold assembly of FIG. 1 showing position of latch arm and latch bar.
Figure 3:
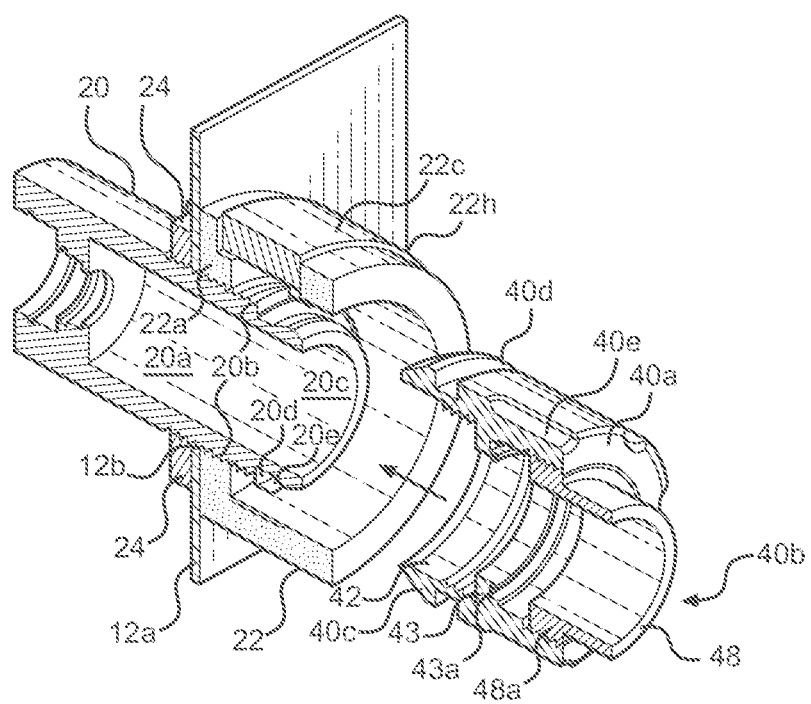
FIG. 3 is a perspective view in section of uncoupled drive manifold assembly and driven shaft assembly of the coupling of FIG. 1.
Figure 4:
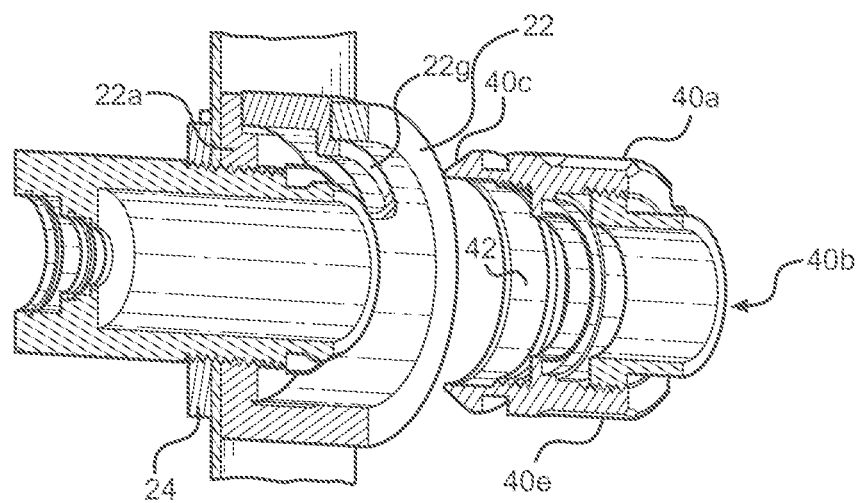
FIG. 4 is another perspective view in section of uncoupled drive manifold assembly and driven shaft assembly of the coupling of FIG. 1.
Figure 5:
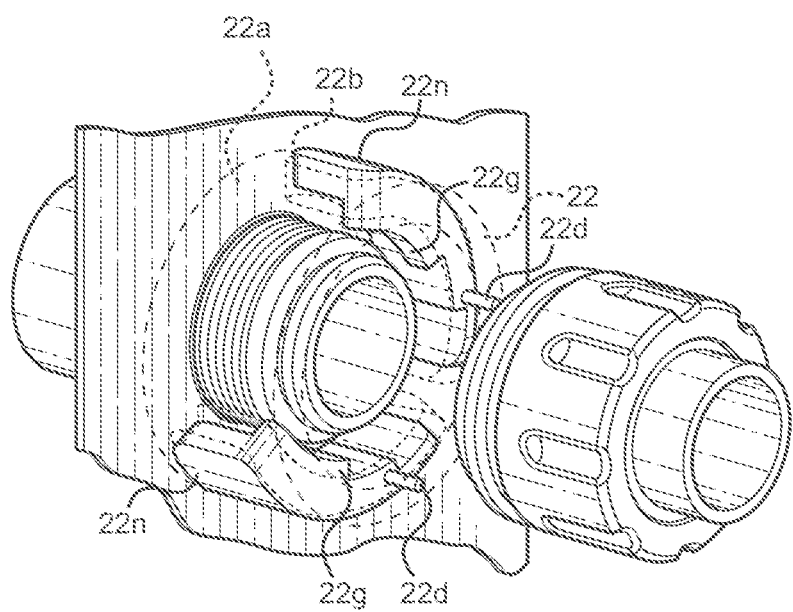
FIG. 5 is a perspective view of uncoupled drive manifold assembly in section along with driven shaft assembly of the coupling of FIG. 1 showing latch arm position opposite to that of FIG. 3 and FIG. 4.
Figure 6:
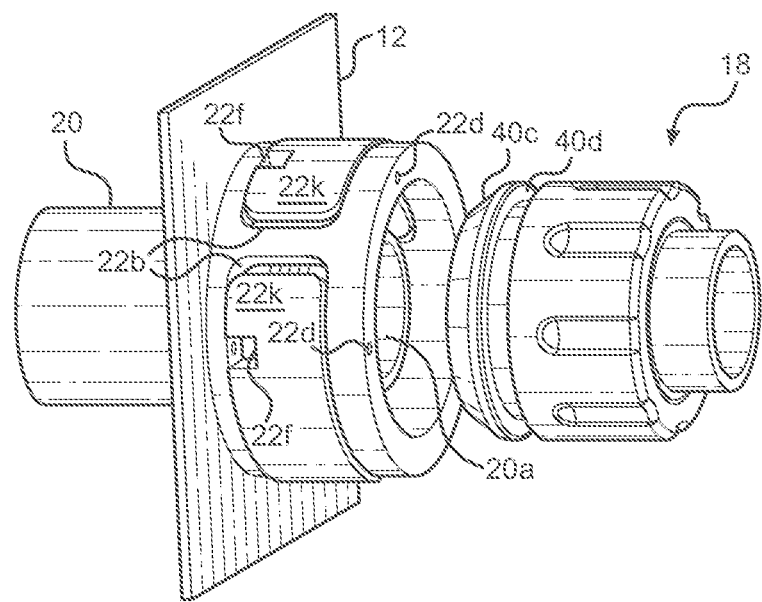
FIG. 6 is a perspective view of uncoupled drive manifold assembly and driven shaft assembly of FIG. 1.
Figure 7:
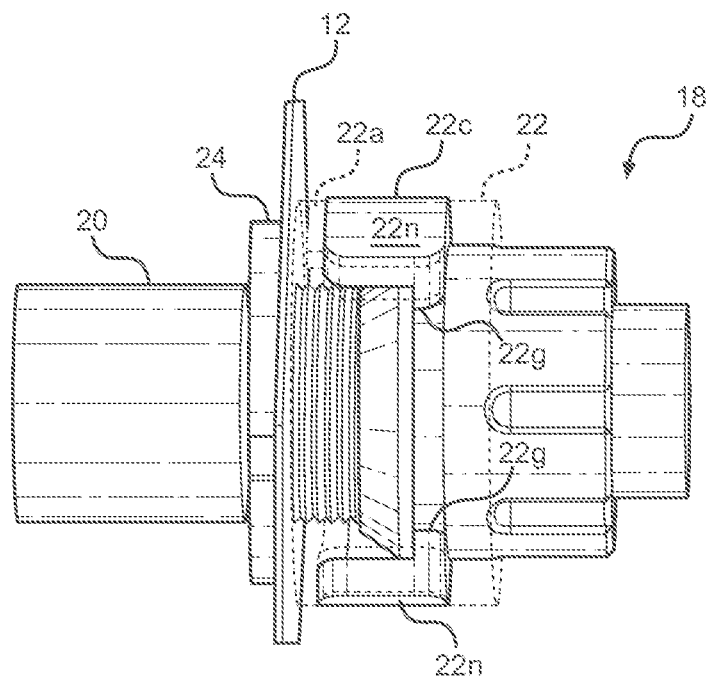
FIG. 7 is a perspective view of inner components of drive manifold assembly coupled with driven shaft assembly of the coupling of FIG. 1 showing relative positions of latch bars and their cooperating grooves.

Referring to FIG. 1, FIG. 2, FIG. 3, FIG. 4, FIG. 5, and FIG. 7, latching concentric outer latching collar 22 comprises a cylindrical body with inwardly directed flange 22a and with wall openings 22b accommodating arcuate latch arms 22c. Arcuate latch arms 22c are set into the wall openings 22b and held there by pivot pins 22d and controlled by torsion springs 22e located in latch arm recesses 22f. The inner surface of each arcuate latch arm 22c has an inwardly directed latch bar 22g for holding driver manifold assembly 16 and driven shaft assembly 18 together as described in detail below. As seen in FIG. 2, FIG. 4, FIG. 5, FIG. 7, and FIG. 8, inwardly directed latch bar 22g is offset to lie along a side edge 22h of its arcuate latch arm 22c. Arcuate latch arms 22c have normal position as shown in FIG. 2 wherein torsion springs 22e urge the arcuate latch arms 22c with inwardly directed latch bar 22g into closed position. Arcuate latch arms 22c are moved to open position for release of driven shaft assembly 18 by manually pushing the inner ends 22k of the arcuate latch arms 22c to pivot on the pivot pins 22d against a spring force (e.g., from the torsion springs 22e) so as to pivot the inwardly directed latch bars 22g outwardly for disengagement with driven shaft assembly 18 (FIG. 5). As shown in FIG. 2 and FIG. 6 each arcuate latch arm 22c is mounted for pivoting movement on one of the pivot pins 22d passing through a wall of the concentric outer latching collar 22 and arcuate latching arms 22c are situated in the wall openings 22b. The location of the pivot pins 22d is offset to provide a fulcrum near the inner ends 22k of the arcuate latch arms 22c so that the other ends 22n of the arcuate latch arms 22c have a greater range of movement about the pivot pins 22d for pivoting inwardly directed latch bars 22g outward to disengage from the driven shaft assembly 18. Accordingly, the inwardly directed latch bars 22g (FIG. 2) are at the other ends 22n of their respective arcuate latch arms 22c. The torsion springs 22e encircling the pivot pins 22d in latch arm recess 22f urge their respective arcuate latch arms 22c into the closed position of FIG. 1 and FIG. 2.

Figure 9:
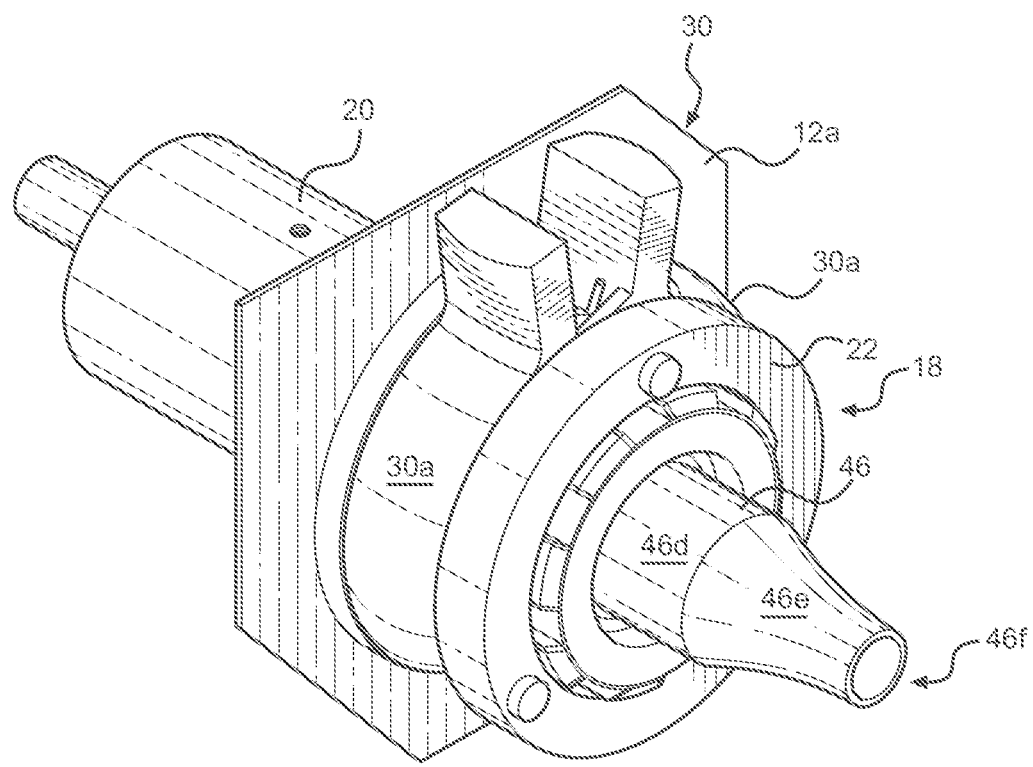
FIG. 9 is a perspective view of another preferred embodiment of drive shaft coupling illustrating coupled drive manifold assembly and driven shaft assembly.
Figure 10:
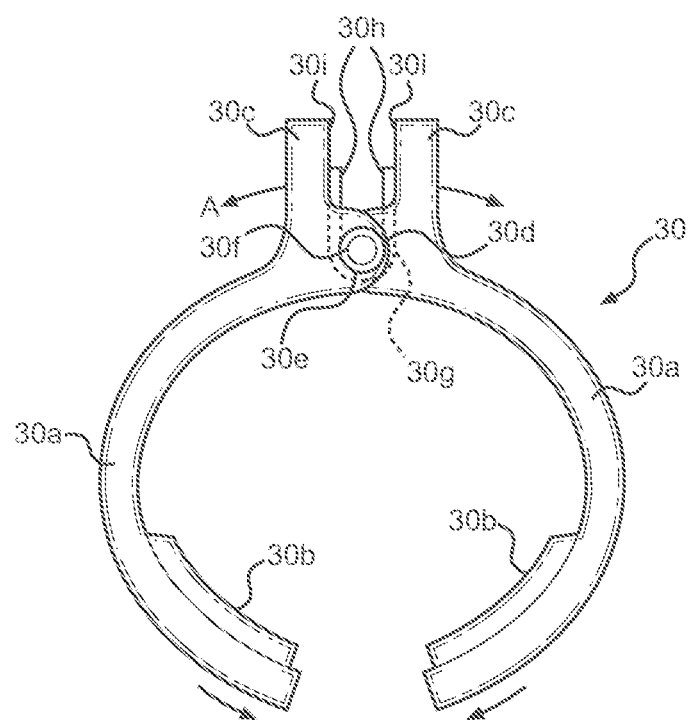
FIG. 10 is a front elevation of latch arm subassembly of another preferred embodiment for driver manifold assembly.

Another preferred embodiment is shown in FIG. 9 and FIG. 10 where common reference numerals indicate the same components as described with respect to the embodiments of FIG. 1, FIG. 2, FIG. 3, FIG. 4, FIG. 5, FIG. 6, FIG. 7, and FIG. 8. This embodiment comprises a latch arm assembly 30 with a movement similar to that of ice tongs (not shown). Each latch arm 30a is arcuate with a latch bar 30b formed on its inner surface for engaging the driven shaft assembly 18 described below. Each arm 30a has an integral actuating tab 30c with tabs acting together in moving the latch arms 30a. Each arm 30a has an integral eyelet 30d such that aligned eyelets 30d receive an assembly sleeve 30e and pivot pin 30f. A torsion spring 30g is centered on the pivot pin 30f and has biasing fingers 30h bearing on inner actuating tab surfaces 30i of the integral actuating tabs 30c urging the latch arms 30a in the direction of arrows "A" (FIG. 10) to normal position for securing driver manifold assembly 16 to driven shaft assembly 18.

The driver manifold assembly 16 receives, retains and seals the driven shaft assembly 18 with attached drive shaft assembly (not shown) in pressurized water tight operation.

As shown in FIG. 1, FIG. 3, and FIG. 4 the driven shaft assembly 18 comprises a driven shaft collar 40 defined by generally cylindrical body 40a with interior passage 40b. The driven shaft collar 40 has angled front surface 40c and an adjacent annular groove 40d. As the driven shaft collar 40 is inserted into the concentric outer latching collar 22, the angled front surface 40c lifts and guides the inwardly directed latch bars 22g into locked operating position in annular groove 40d where they are held in place by torsion springs 22e. The cylindrical body 40a includes a set of finger-shaped recesses 40e to aid gripping the driven shaft collar 40 for insertion into the concentric outer latching collar 22.

The drive collar interior passage 40b (FIG. 3, FIG. 4, and FIG. 8) includes the smooth annular sealing surface 42 for forming a water tight seal against an inner duct sealing element (e.g., seal 20e) when driven shaft collar 40 and concentric outer latching collar 22 are locked in operating position. If desired, a section of interior surface adjacent the sealing surface 42 may be threaded (e.g., with threads 42a) to accommodate use of the driven shaft collar 40 with legacy tube cleaning machines already in commercial use.

An interior annular rib 43 normal to the axis of the driven shaft collar 40 extends radially inward from the interior surface and presents a rearward facing annular channel 43a that receives and holds yoke 46 depicted in FIG. 8 and FIG. 9. A tubular bushing 48 with threaded flange 48a fits into the back end of the driven shaft collar 40 for engaging an outer flange 46a of the yoke 46 and securing it by a rib 46b in position in the rearward facing annular channel 43a. A front face 43b of the interior annular rib 43 is a sealing surface for pressurized water when used with a machine already in commerce.

Referring to FIG. 8 and FIG. 9, yoke 46 comprises an elongate tubular body of integral cylindrical 46d and conical section 46e and an interior passage 46f for tube cleaning shaft 14 and its sheath 50. The outer flange 46a at a front end of the yoke 46 includes the rib 46b that fits into the rearward facing annular channel 43a. A water tight seal is established between the rib 46b and the rearward facing annular channel 43a by advancing threaded flange 48a into wrench tight engagement with the outer flange 46a of the yoke 46.

The tube cleaning drive shaft assembly 17 shown in FIG. 8 includes the yoke 46 sealed at an inner surface to the sheath 50 together with a wound steel flexible tube cleaning shaft 14 with a drive clutch (e.g., the shaft drive bar 14b) passing through the yoke 46 and the sheath 50 for receiving rotation from a tube cleaning machine drive motor (not shown).

The inner duct 20 and the sheath 50 define an interior enclosed channel 52 for flow of pressurized cleaning fluid (arrow "B") typically water from a tube cleaning machine through the sheath 50 exiting its far end at cleaning tool connection (not shown). The common passage 20a and the driven shaft collar 40 have a watertight seal formed by engagement of the seal 20e (such as an O-ring) and the sealing surface 42. The combination of pressurized fluid and rotating cleaning element accomplishes tube cleaning. The cleaning fluid may be pressurized by pump (not shown) within the tube cleaning machine.

FIG. 11 illustrates another preferred embodiment of the invention having components in common with the embodiments of FIG. 1, FIG. 2, FIG. 3, FIG. 4, FIG. 5, FIG. 6, FIG. 7, FIG. 8, FIG. 9, and FIG. 10 that are identified by common reference numerals.

As shown in FIG. 11, the driven shaft assembly 60 comprises a driven shaft collar 62 defined by generally cylindrical body 62a with threaded interior passage 62b, and inwardly directed end flange 62c. The driven shaft collar 62 has angled front surface 62d and an adjacent annular groove 62e. As the driven shaft collar 62 is inserted into the latch arm assembly 30, the angled front surface 62d lifts and guides the latch bars 30b into locked operating position in the annular groove 62e where they are held in place by latch arm springs (not shown). The outer surface of the driven shaft collar 62 may include a set of finger-shaped recesses (not seen in FIG. 11) but similar to those of FIG. 1, FIG. 2, FIG. 3, FIG. 4, FIG. 5, FIG. 6, and/or FIG. 7, at 40e, to aid gripping the driven shaft collar 62 for insertion into the concentric outer latching collar 22.

If desired, a section of interior surface adjacent the sealing surface may be threaded (e.g., with threads 62b) to accommodate use of the driven shaft collar 62 with legacy tube cleaning machines (not shown) already in commercial use.

The driven shaft assembly 60 also comprises a barbed insert 64 having a central tubular section 64a with barbed outer surface 64b for mounting and securing a sheath 66 with interior channel 66a through which flexible tube cleaning shaft 14 and pressurized fluid pass in a tube cleaning operation. The barbed insert 64 further has a radial flange 64c for nesting relation with the driven shaft collar 62 in such a manner as to secure the yoke 46 by upturned outer flange 46a within the driven shaft collar 62.

The barbed insert 64 further includes a cylindrical sealing embossment 64d with O-ring groove 64e extending axially from the radial flange 64c. An O-ring 64f forms a fluid pressure tight joint between the driven shaft assembly 60 and the common passage 20a of the inner duct 20.

The inner duct 20 and the sheath 66 define an interior enclosed channel for flow of pressurized cleaning fluid typically water from the tube cleaning machine through the sheath 66 exiting its far end at a cleaning tool connection (not shown). The inner duct 20 and the driven shaft collar 62 have a watertight seal formed by engagement of the O-ring 64f and the sealing surface 42. The combination of pressurized fluid and rotating cleaning element accomplishes tube cleaning.

In assembling the driver manifold assembly 16 and the driven shaft assembly 60 of FIG. 11, the driven shaft collar 62 together with the yoke 46, the sheath 66, and the rotary tube cleaning shaft 14 are inserted into the latch arm assembly 30. The angled front surface 62d of the driven shaft collar 62 engages the latch bars 30b and lifts the latch arms 30a about their pivot point (e.g., at pivot pins 22d) for registering the latch bars 30b in the annular groove 62e for securing the coupling.

As shown in FIG. 11, the flexible tube cleaning shaft 14 with the shaft drive bar 14b engages drive head "H" rotated by the machine drive motor (not shown).

FIG. 12-16 show another preferred embodiment of the invention that comprises drive shaft coupling 80 including drive manifold assembly 82 and driven shaft assembly 84.

The drive manifold assembly 82 comprises generally cylindrical housing 82a with circumferential flange 82b for securing coupling to tube cleaning machine housing side wall 12a, and exterior embossments 82d with spaced radial flanges 82e for mounting and/or guiding cooperating latches 82f that hold driven shaft assembly 84 in place in connected coupling. The exterior embossments 82d have ends turned radially defining the radial spaced flanges 82e that guide and/or confine the cooperating latches 82f as they rotate on pivot pins 82g. Pivot pins 82g pass through embossments 82d and housing body wall and through latch posts 82t (FIG. 12) extending into housing recess 82u that provides a pivot connection for its respective cooperating latch 82f. Each cooperating latch 82f comprises a main body portion 82h with latch hook 82i at one end, and finger plate 82j at other end for pivoting the cooperating latches 82f on the pivot pins 82g against a compression spring 82k. The compression spring 82k urges the cooperating latches 82f to closed position seen in FIG. 12. Each latch hook 82i has a curved head 82m by which the cooperating latches 82f are cammed out of the way (FIG. 13) as the driven shaft assembly 84 is coupled to the drive manifold assembly 82. For disassembling the coupling the operator squeezes finger plates 82j together releasing the cooperating latches 82f so that driven shaft assembly 84 can be pulled out of the manifold assembly 82.

The embodiments of coupling disclosed herein may be regarded as sprung latch couplings in view of the cooperating latches 82f themselves being moved or sprung out of the way by the driven shaft assembly 84 as the coupling is being connected and then returning to operative latching position when the coupling is completed. In some embodiments, the pivot pins 82g are situated at an offset from the axis of the manifold assembly 82 that is equivalent to (or at least less than) an offset of the latching location of the latch hooks 82i with the driven shaft assembly 84. This may provide, for example, a more secure connection and/or coupling than if the pivot pins 82g were disposed, for example, in or on the radial flanges 82e.

Figure 15:
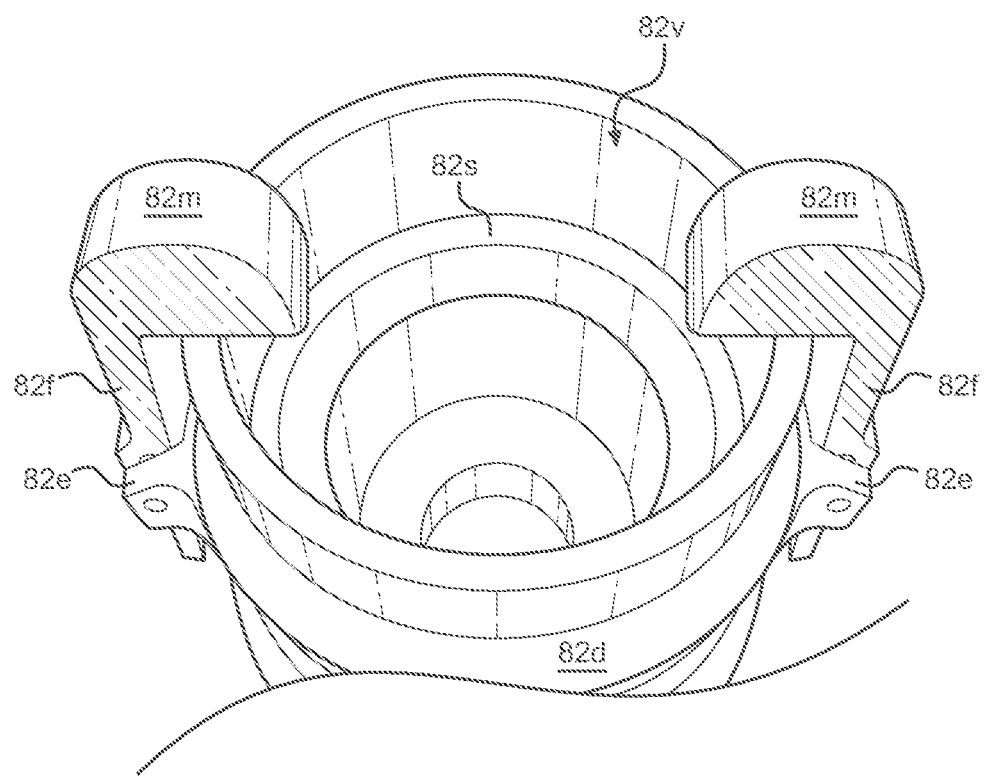
FIG. 15 is a perspective view of the coupling of FIG. 12 illustrating drive manifold interior that receives and seals driven shaft assembly.

Cylindrical housing 82a has an internal bore 82p (FIG. 12 and FIG. 16) for passage of tube cleaning machine tube cleaning fluid (not explicitly shown) and rotating flexible tube cleaning shaft 14, with sealing wall 82r and driven assembly fluid seal 82s within driven shaft receptacle 82v (FIG. 15).

The driven shaft assembly 84 (FIG. 14 and FIG. 16) comprises a driven shaft collar 84a defined by generally cylindrical first body 84b of outer diameter matching inner diameter of the driven shaft receptacle 82v and a second body 84c of lesser diameter. A sealing surface 84d of the first body 84b forms a seal against driven assembly fluid seal 82s in the assembled coupling. A threaded section 84e receives a retaining cap 84f for holding sheath 84g to the driven shaft assembly 84.

Figure 16:
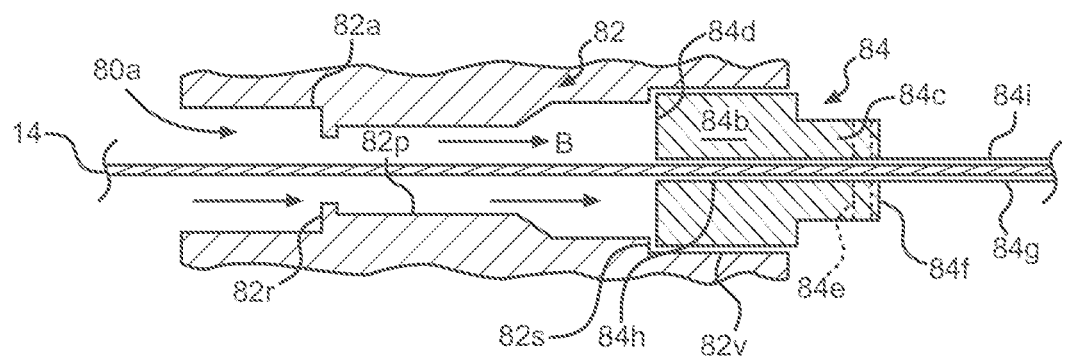
FIG. 16 is a schematic view of internal passage of drive shaft coupling of FIG. 12 showing position of flexible drive shaft and fluid flow.

As shown in FIG. 16, an interior passage 80a passes entirely through the drive manifold assembly 82 and driven shaft assembly 84 (bore 84h) entering an internal passage 84i of the sheath. Tube cleaning fluid (arrow "B") and the rotating flexible tube cleaning shaft 14 pass from the tube cleaning machine (not shown) through the drive manifold assembly 82 and the driven shaft assembly 84 for tube cleaning operations.

FIG. 17, FIG. 18, FIG. 19, FIG. 20, FIG. 21, and FIG. 22 show another preferred embodiment of the invention comprises drive shaft coupling 90 including drive manifold assembly 92 and driven shaft assembly 94.

Figure 17:
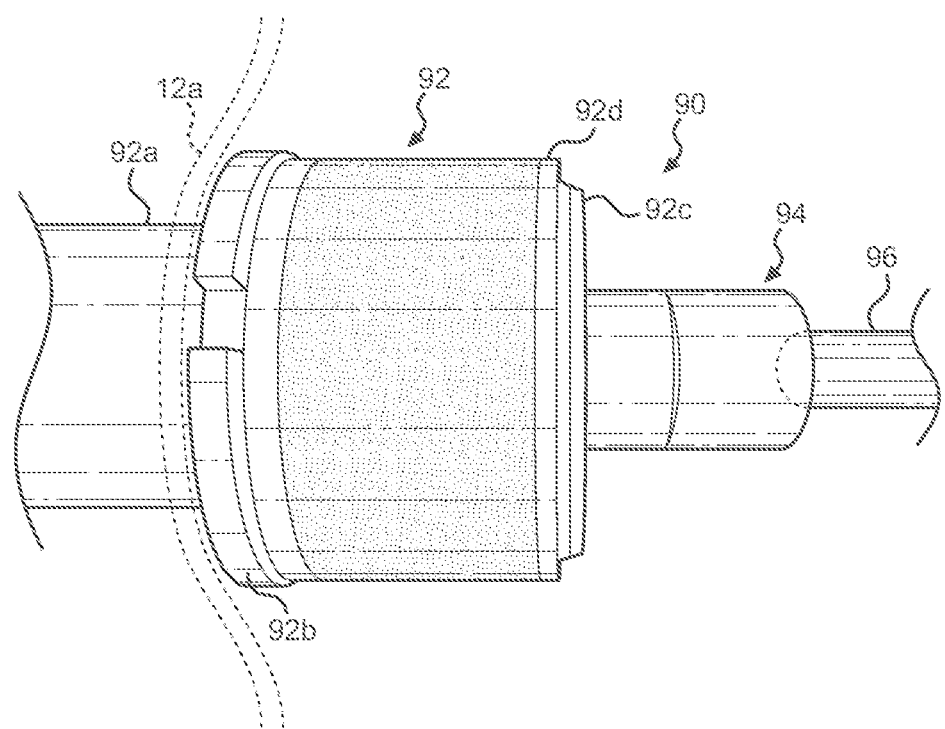
FIG. 17 is a side elevation view of drive shaft coupling of another preferred embodiment illustrating exterior layout of coupled drive manifold assembly and driven shaft assembly.
Figure 18:
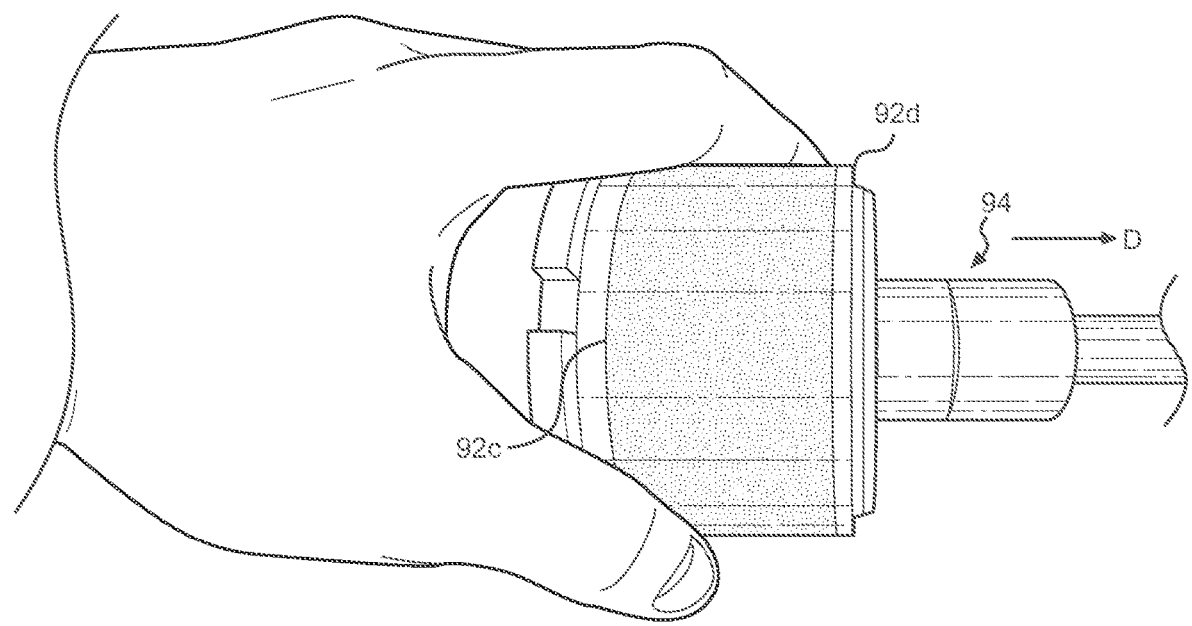
FIG. 18 is a perspective view of drive shaft coupling of FIG. 17 illustrating component action when drive manifold assembly and driven shaft assembly are uncoupled.
Figure 19:
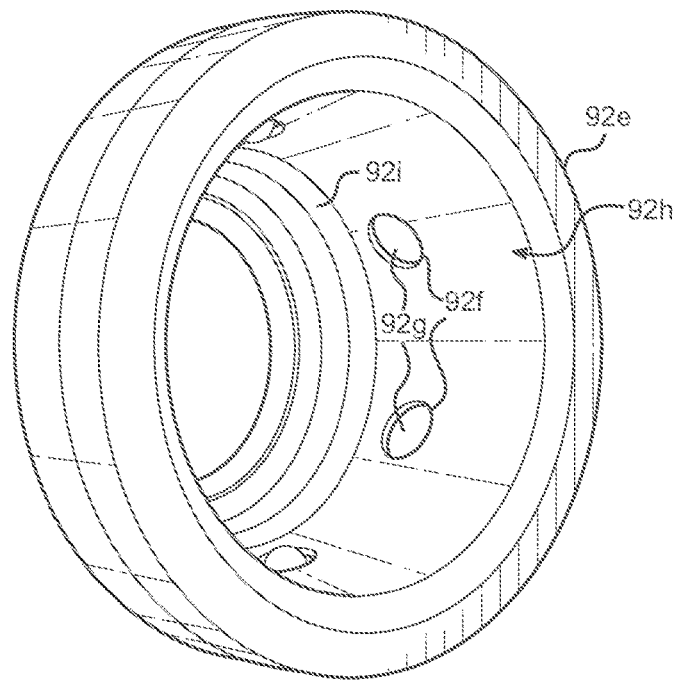
FIG. 19 is a perspective view of front face of drive manifold assembly of the coupling of FIG. 17 illustrating its receptacle cavity for receiving and sealing driven shaft assembly.
Figure 20:
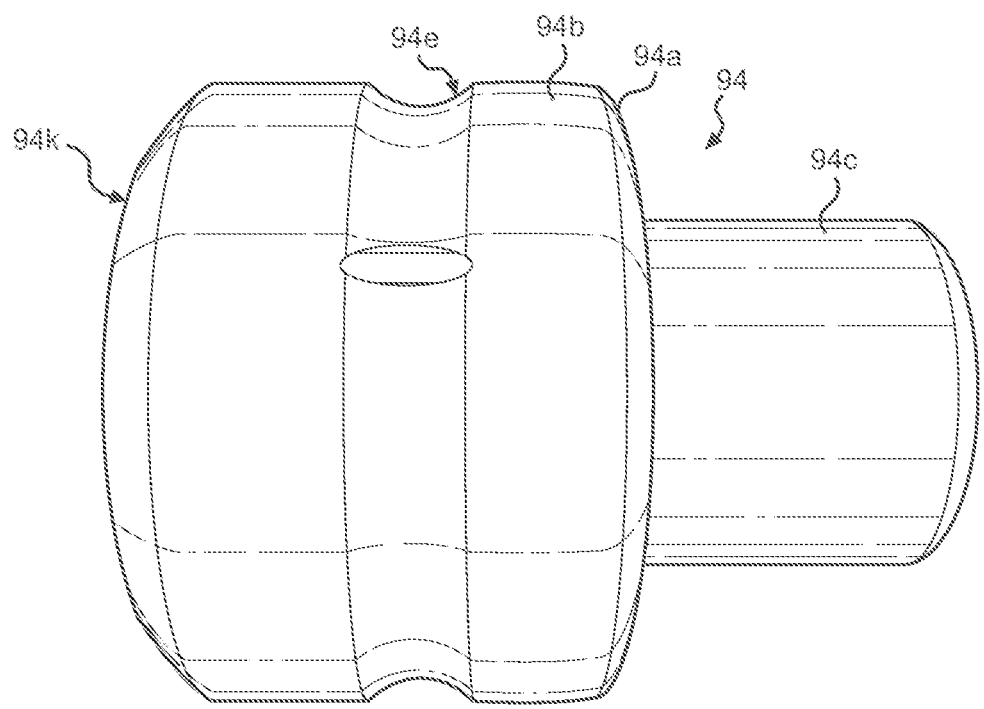
FIG. 20 is a side elevation view of the coupling of FIG. 17 illustrating driven shaft body surface that couples with receptacle of FIG. 19 and mounts driven shaft assembly sheath.

The drive manifold assembly 92 comprises generally cylindrical housing 92a with circumferential flange 92b for securing coupling to tube cleaning machine housing side wall 12a. Housing section 92c to the right of the circumferential flange 92b as seen in FIG. 17 and FIG. 18 mounts a spring biased, sliding latch 92d of knurled cylinder telescoped over housing section 92c. As seen in FIG. 19, section wall 92e has radial bores 92f accommodating a set captive balls 92g that project into section socket 92h when sliding latch 92d is in the position of FIG. 17 for holding driven shaft assembly 94 in place in the connected coupling. By moving sliding latch 92d in the direction of arrow "D" in FIG. 18, captive balls 92g are freed to move radially in radial bores 92f and the driven shaft assembly 94 can be inserted into or pulled out of section socket 92h to connect or disconnect the coupling.

Figure 21:
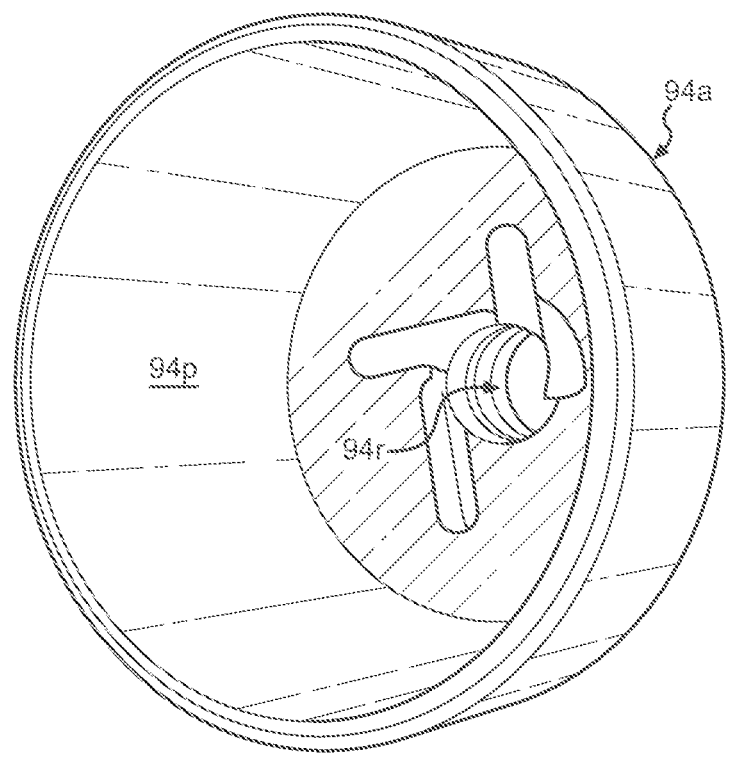
FIG. 21 is a perspective view of front face of driven shaft assembly of the coupling of FIG. 21.

For its part, driven shaft assembly 94 (FIG. 20 and FIG. 21) comprises an integral cylinder 94a having a greater diameter section 94b and a lesser diameter section 94c. A sheath 96 (FIG. 17 and FIG. 22) with interior passage 96a for tube cleaning fluid (arrow "B") and rotary, flexible tube cleaning shaft 14 is connected by retaining cap 96b to the lesser diameter section 94c. The outer surface 94d of the greater diameter section 94*b* has a circumferential groove 94*e* that cooperates with captive balls 92*g* for latching and unlatching drive manifold assembly 92 and driven shaft assembly 94. As shown in FIG. 21, integral cylinder 94*a* includes plenum 94*p* for receiving tube cleaning fluid through the coupling and directing it through bore 94*r* into the sheath 96.

Section socket 92*h* (FIG. 19) is provided with a sealing ring 92*i* that forms a seal against the adjacent end 94*k* (FIG. 20 and FIG. 22) of integral cylinder 94*a* to confine tube cleaning fluid within the connected coupling.

Figure 22:
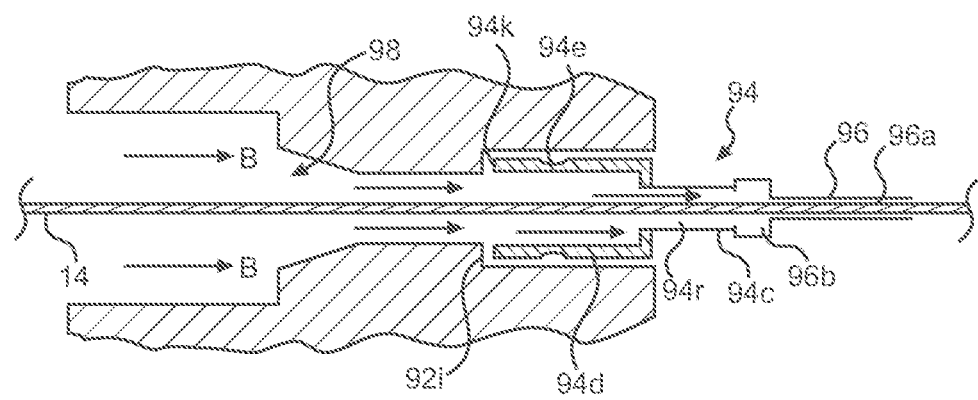
FIG. 22 is a schematic view of internal passage of drive shaft coupling of FIG. 17 showing position of flexible drive shaft and fluid flow.

As shown in FIG. 22, an interior passage 98 passes entirely through the drive manifold assembly 92 and the driven shaft assembly 94 entering internal passage 96*a* in sheath 96. Tube cleaning fluid (arrow "B") and the rotating flexible tube cleaning shaft 14 pass from the tube cleaning machine (not shown) through drive the manifold assembly 92 and driven shaft assembly 94 and through the sheath 96 for tube cleaning operations.

Figure 23:
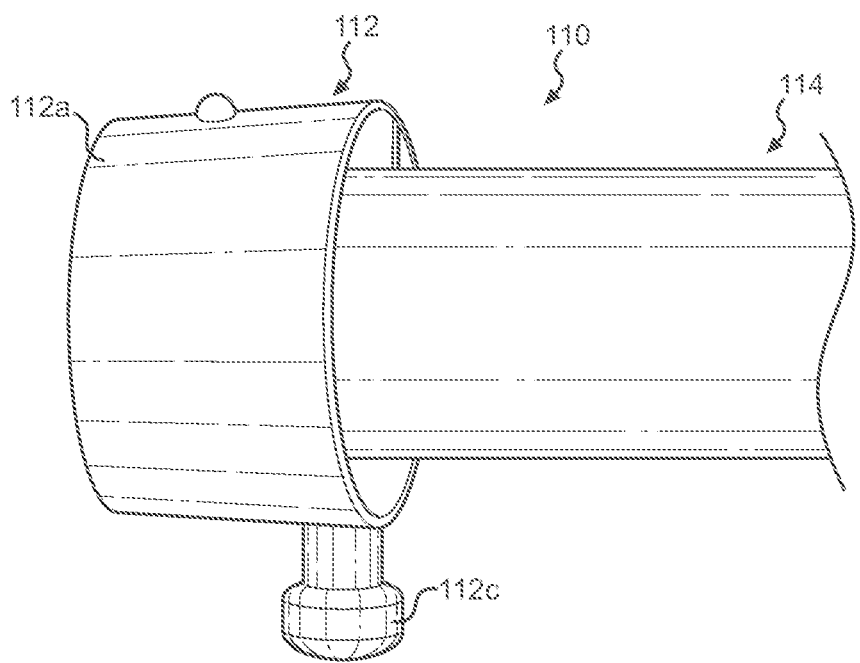
FIG. 23 is a side elevation view of drive shaft coupling of another preferred embodiment of the invention illustrating exterior layout of coupled drive manifold assembly and driven shaft assembly.
Figure 24:
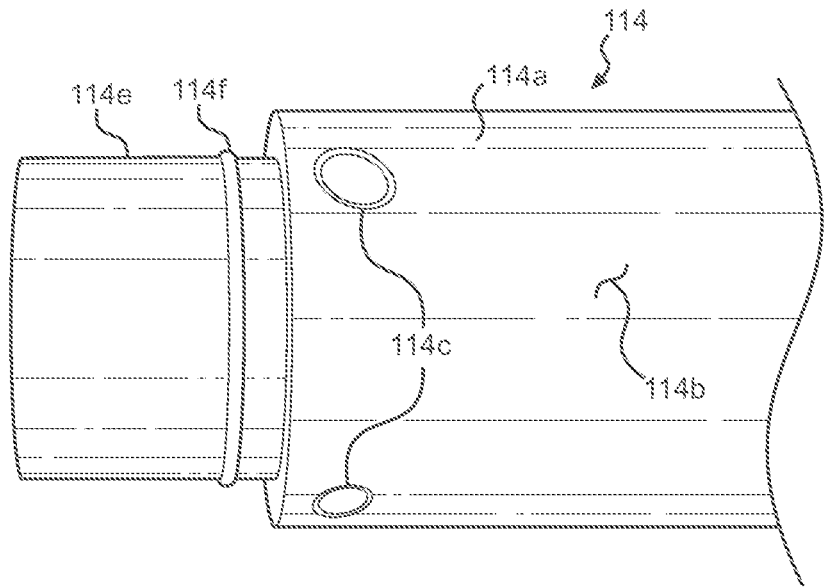
FIG. 24 is a perspective view of driven shaft assembly of FIG. 23.
Figure 25:
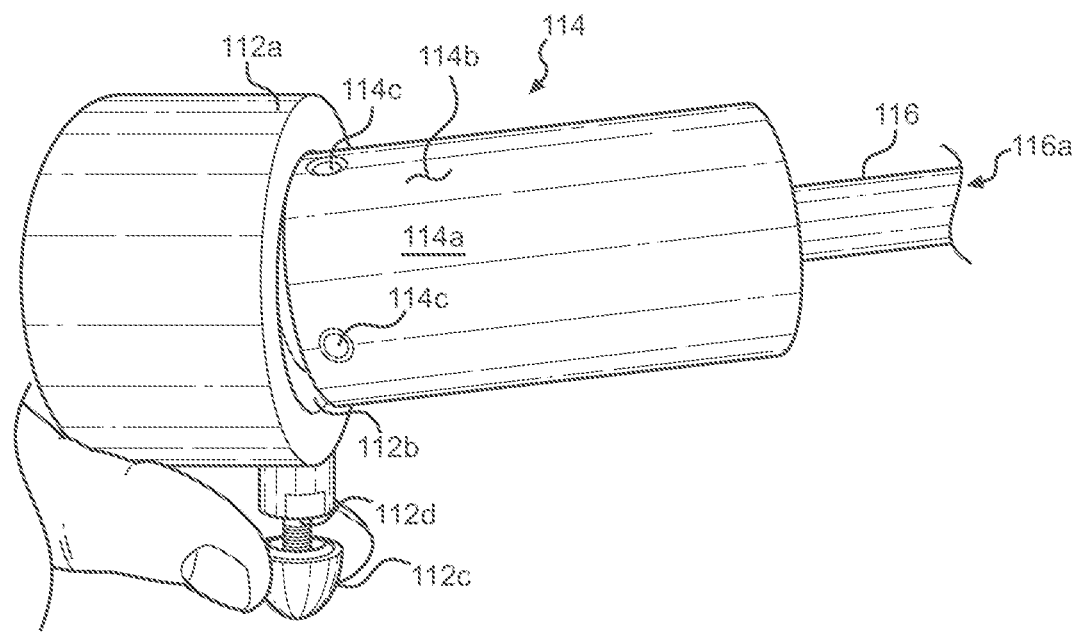
FIG. 25 is a perspective view of the manner of assembling the coupling of FIG. 23.

FIG. 23, FIG. 24, and FIG. 25 show another preferred embodiment of the invention comprises drive shaft coupling 110 including drive manifold assembly 112 and driven shaft assembly 114.

The drive manifold assembly 112 comprises generally cylindrical housing 112*a* (e.g., secured to tube cleaning machine housing side wall 12*a*; not shown in FIG. 23), and having a socket 112*b* for receiving driven shaft assembly 114. The cylindrical housing 112*a* as seen in FIG. 23 and FIG. 25 mounts a retaining latch 112*c* that projects retaining pin 112*d* into the socket 112*b* for registry with and retention of the driven shaft assembly 114 in connected coupling. For its part, driven shaft assembly 114 comprises a cylinder 114*a* and sheath 116 (FIG. 25) with interior passage 116*a* for tube cleaning fluid (not explicitly shown) and a rotary, flexible drive shaft (not shown in FIG. 25; such as the tube cleaning shaft 14). The outer surface 114*b* of the cylinder 114 has a plurality of receptor sockets 114*c* for receiving retaining pin 112*d* so as to hold coupling components together. The retaining pin 112*d* engages one of the receptor sockets 114*c* such that a plurality of circumferentially spaced receptor sockets 114*c* facilitates quickly aligning and connecting the components.

The cylinder 114 has a necked down sealing section 114*e* with sealing ring 114*f* to provide fluid tight seal for the assembled coupling.

In a manner similar to that of FIG. 16 and FIG. 22, the interior passage (not explicitly shown) extends entirely through the drive manifold assembly 112 and the driven shaft assembly 114 entering the internal passage 116*a* in the sheath 116. Tube cleaning fluid and the rotating flexible drive shaft (not shown; e.g., the tube cleaning shaft 14) pass from the tube cleaning machine (also not shown) through the drive manifold assembly 112 and the driven shaft assembly 114 and through the sheath 116 for tube cleaning operations.

Figure 26:
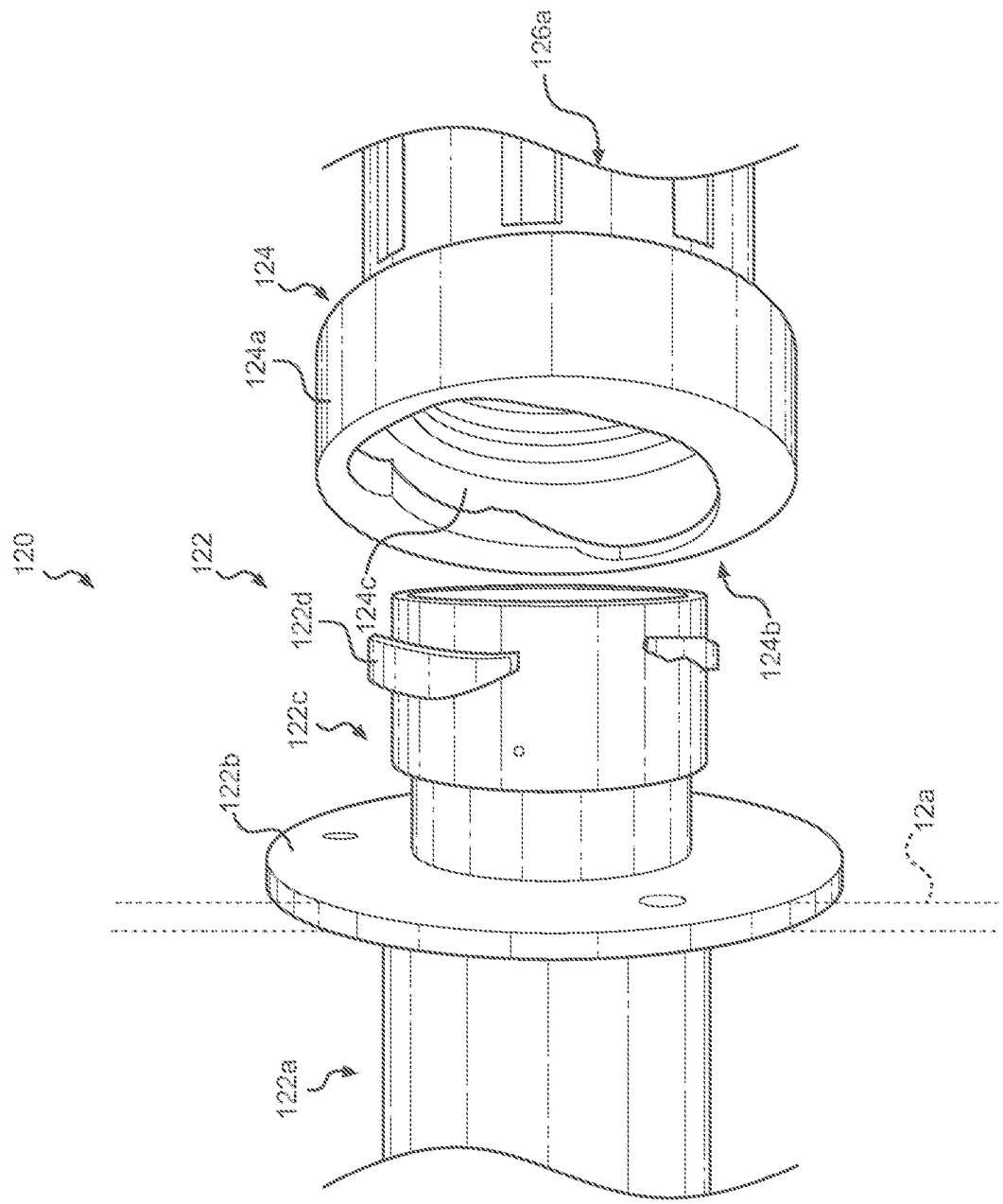
FIG. 26 is a side elevation view of drive shaft coupling of another preferred embodiment of the invention illustrating exterior layout for coupling drive manifold assembly and driven shaft assembly.

FIG. 26 shows another preferred embodiment which comprises drive shaft coupling 120 including drive manifold assembly 122 and driven shaft assembly 124.

The drive manifold assembly 122 comprises generally cylindrical housing 122*a* with circumferential flange 122*b* for securing coupling to tube cleaning machine housing side wall 12*a*. A housing section 122*c* to the right of the circumferential flange 122*b* as seen in FIG. 26 is fitted with a bayonet connection 122*d* for receiving the driven shaft assembly 124.

The driven shaft assembly 124 comprises cylinder 124*a* with interior passage 126*a* for tube cleaning fluid and a rotary, flexible drive shaft (not shown; such as the tube cleaning shaft 14). An inner surface 124*b* of the cylinder 124*a* has a plurality of bayonet sockets 124*c* to hold coupling components together and which facilitates quickly connecting the components.

The interior passage 126*a* of the drive shaft coupling 120 for tube cleaning fluid, rotary, flexible tube cleaning shaft and coupling fluid seal may be arranged as for embodiments of the invention described above.

In use, when the coupling is made, rotary motion is received by the rotary drive shaft, pressurized water flows through the coupling into the interior of the drive shaft sheath (not shown in FIG. 26), and a tube cleaning tool such as a spiral wound brush (not shown) is attached to the far end of the drive shaft. An operator places the tool at a tube entrance and begins tube cleaning.

Figure 27:
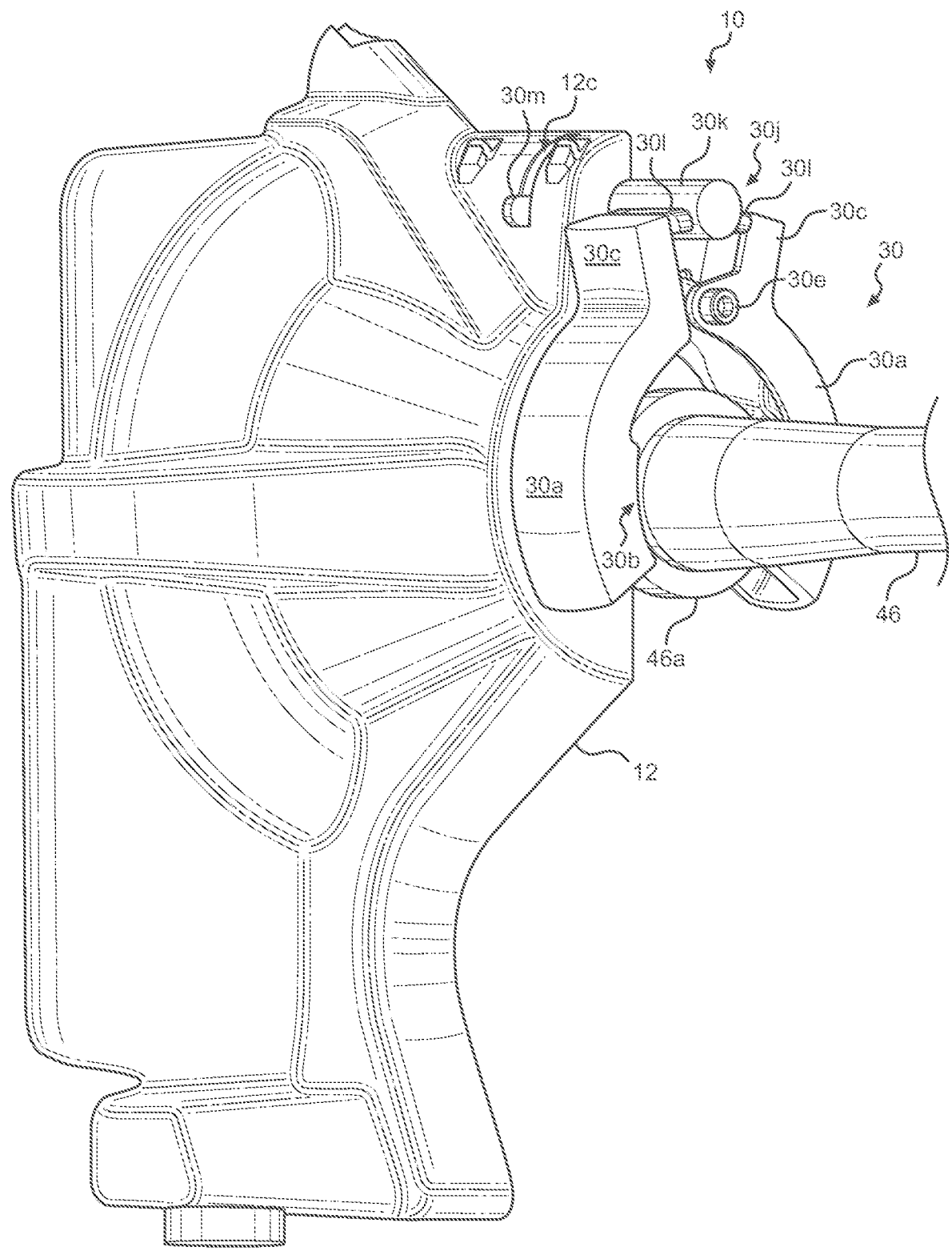
FIG. 27 is a perspective view of another embodiment of a drive shaft coupling.
Figure 28:
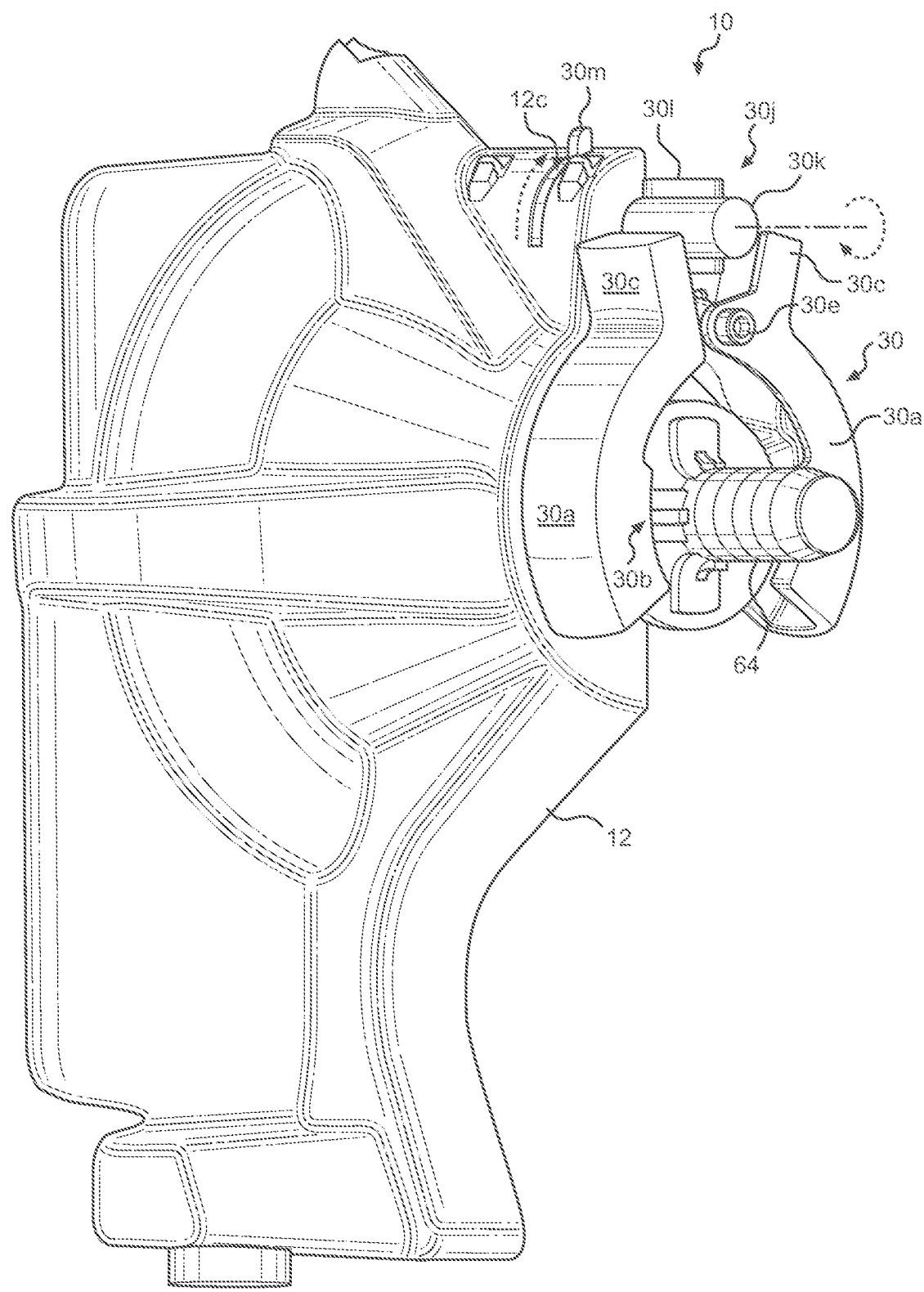
FIG. 28 is a perspective view of another embodiment of a drive shaft coupling.

Referring now to FIG. 27 and FIG. 28, a perspective view of another preferred embodiment of a drive shaft coupling 10 is shown. The drive shaft coupling 10 may, for example, comprise a latch arm assembly 30 coupled to a tube cleaning machine housing 12. In some embodiments, the latch arm assembly 30 may be similar to the latch arm assembly 30 of FIG. 9. The latch arm assembly 30 may comprise, for example, two opposing and cooperating latch arms 30*a* coupled via an assembly sleeve 30*e* which functions as a pivot point. Each latch arm 30*a* may comprise, in some embodiments, an integral latch bar 30*b* and/or an integral actuating tab 30*c*.

According to some embodiments, a yoke 46 may be inserted onto a barbed insert 64 that is coupled to the tube cleaning machine housing 12. The barbed insert 64 may provide pressurized fluid and/or a driven shaft (neither of which are shown in FIG. 27 or FIG. 28) to the yoke 46, for example. In some embodiments, the integral latch bars 30*b* may engage an outer flange 46*a* of the yoke 46, thereby retaining the yoke 46 on the barbed insert 64, e.g., during pressurized cleaning operations. In some embodiments, actuation of the integral actuating tabs 30*c*, such as via an application of pressure (e.g., via a finger and thumb of an operator; not shown) that coerces the integral actuating tabs 30*c* toward each other, may operate to pivot the integral latch bars 30*b* away from each other, thereby releasing or uncoupling the yoke 46.

In some embodiments, such as due to pressurized forces within the coupling 10, a locking mechanism 30*j* may be provided. The locking mechanism 30*j* may, for example, be coupled to the tube cleaning machine housing 12 and generally disposed between the integral actuating tabs 30*c*. The locking mechanism 30*j* may comprise, in some embodiments, a cylindrical body portion 30*k*, one or more radial protrusions 301, and/or an engaging tab 30*m*. According to some embodiments, the cloaking mechanism 30*l* may be selectively rotated to two different positions: (i) a first or engaged position as shown in FIG. 27, where the radial protrusion(s) 301 are aligned to extend between the integral actuating tabs 30*c*, and (ii) a second or disengaged position as shown in FIG. 28, where the radial protrusion(s) 301 are aligned away from the integral actuating tabs 30*c*.

As depicted in FIG. 27 and FIG. 28, the engaging tab 30*m* may be disposed in an actuating slot 12*c* of the tube cleaning machine housing 12 such that when selectively engaged in a first position as depicted in FIG. 27, the radial protrusion(s) 301 are aligned to the first or engaged position and accordingly prevent the integral actuating tabs 30*c* from being moved toward each other, and accordingly prevent the integral latch bars 30*b* from disengaging with the yoke 46. In such a manner, for example, the yoke 46 may be more securely secured to the barbed insert 64, such as be preventing pressure within the coupling 10 from accidentally or undesirably disengaging the latch arms 30a.

According to some embodiments, and as shown in FIG. 28, the engaging tab 30m may be selectively engaged in a second position such that the radial protrusion(s) 30l are aligned to the second or disengaged position and accordingly allow the integral actuating tabs 30c to be moved toward each other, thereby freeing the yoke 46 from the integral latch bars 30b.

In some embodiments, although not explicitly shown in FIG. 27 or FIG. 28, the integral latch bars 30b and/or the outer flange 46a of the yoke 46 may be cammed, beveled, or chamfered such that a rotational movement imparted to the yoke 46 may engage the cammed portion(s) of the outer flange 46a with the respective cammed portion(s) of the integral latch bars 30b, such that the integral latch bars 30b are forced open by the rotational engagement of the cammed portions. In some embodiments, actuation of the locking mechanism 30j may prevent disengagement of the yoke 46 via such a cammed rotation procedure (e.g., by preventing pivoting of the latch arms 30a).

Figure 29:
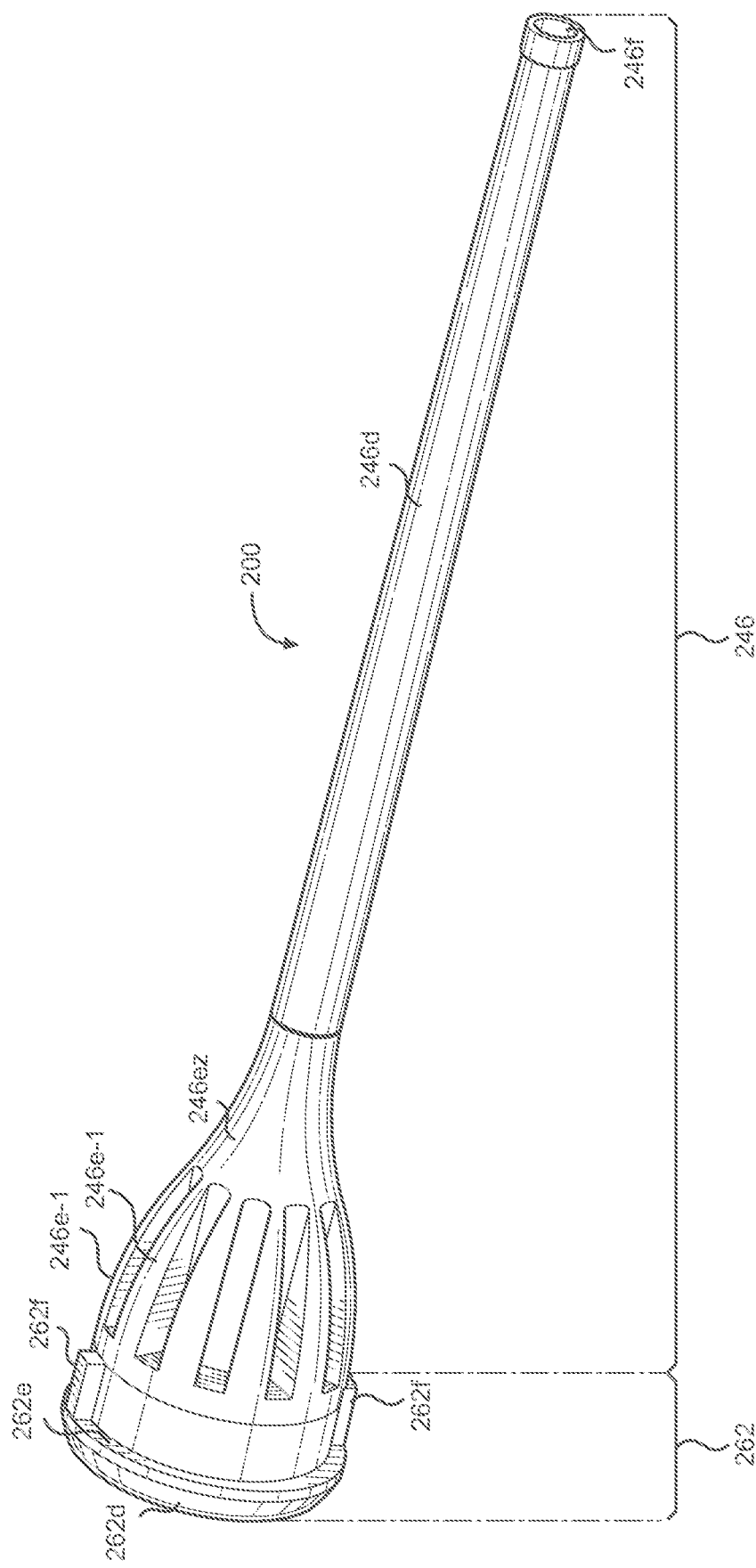
FIG. 29 is a perspective view of a flexible drive shaft adaptor according to some embodiments.

Turning now to FIG. 29, a perspective view of a flexible drive shaft adaptor 200 according to some embodiments is shown. The flexible drive shaft adaptor 200 may, for example, be utilized in place of the separate driven shaft collar 62 and yoke 46 as described herein. The flexible drive shaft adaptor 200 may, in some embodiments, be formed from a semi-flexible material such as nylon, polyurethane, polypropylene, such as to accommodate bending or flexing of a driven shaft (not shown) disposed therein. According to some embodiments, the flexible drive shaft adaptor 200 may generally comprise an integrated (e.g., unibody) driven shaft collar 62 and yoke 46. In some embodiments, for example, the flexible drive shaft adaptor 200 may comprise a driven shaft collar element 262 comprising a generally cylindrical body portion defining an angled front surface 262d sloping radially inward to a toe at a first end of the driven shaft adaptor 200, an exterior radial flange 262e disposed at the heel of the angled front surface 262d, and an exterior key 262f protruding radially outward. As depicted in FIG. 29, the exterior key 262f may comprise a plurality of key elements and/or protrusions such as the two exterior keys 262f disposed at opposing sides of the driven shaft collar element 262. In some embodiments, the exterior key 262f may comprise a first end disposed to abut the heel of the exterior radial flange 262e and a second end terminating at a conical portion 246e of a yoke element 246.

According to some embodiments, the flexible drive shaft adaptor 200 may comprise the yoke element 246 integral with and disposed adjacent to the driven shaft collar element 262. In some embodiments, the yoke element 262 may comprise the conical portion 246e extending axially from a wide end adjacent to the driven shaft collar element 262 to a narrow end distal from the driven shaft collar element 262. In some embodiments, a plurality of axially elongated ribs 246e-1 may be formed and/or disposed on the conical portion 246e of the yoke element 262, such as to allow for a better grip of the flexible drive shaft adaptor 200 when being coupled to a tube cleaning machine (not shown in FIG. 29). According to some embodiments, the yoke element 262 may comprise an elongate tubular body portion 246d extending from the narrow end of the conical portion 246e to a second end of the driven shaft adaptor 200. According to some embodiments, the flexible drive shaft adaptor 200 (or the tubular body portion 246d thereof) may be hollow and/or otherwise define an interior passage 246f (e.g., through the yoke element 262). The interior passage 246f may, for example, be utilized in operation of a tube cleaning machine by housing a flexible shaft (not shown in FIG. 29) and/or passing pressurized fluid (not explicitly shown).

Figure 30:
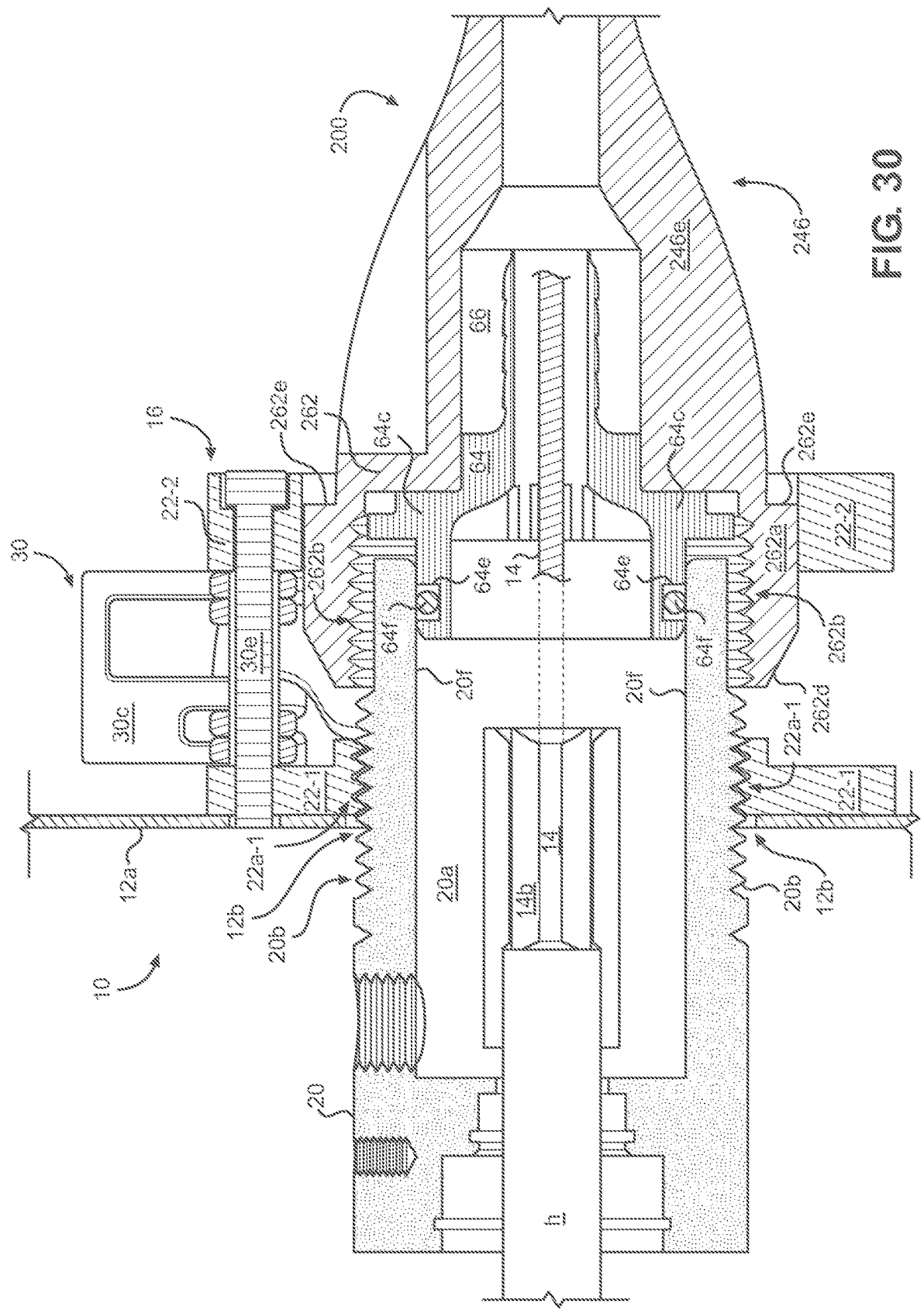
FIG. 30 is a side elevation view in section of a drive shaft coupling according to some embodiments, illustrating interior layout of a coupled drive manifold assembly and flexible drive shaft adaptor.

Referring now to FIG. 30, a side elevation view in section of a drive shaft coupling 10 according to some embodiments, illustrating interior layout of a coupled drive manifold assembly 16 and flexible drive shaft adaptor 200, is shown. In some embodiments, the drive shaft coupling 10 may comprise a tube cleaning machine housing sidewall 12a having and/or defining a housing opening 12b (of a tube cleaning machine, the other portions of which are not depicted in FIG. 30) through which a tube cleaning shaft 14 (e.g., having a shaft drive bar 14b that engages with a drive head "H", driven by a motor of the tube cleaning machine; not shown) is disposed. According to some embodiments, a driver manifold assembly 16 may be coupled to an inner duct 20 defining a common passage 20b (defining an interior wall or sealing surface 20f) through which the tube cleaning shaft 14 is disposed. In some embodiments, the inner duct 20 may be coupled to the driver manifold assembly 16 via inner duct threads 20b disposed, for example, on an exterior surface of the inner duct 20. The driver manifold assembly 16 may comprise, for example, a first concentric collar 22-1 having interior threads 22a-1 that engage with the inner duct threads 20b (e.g., securing the inner duct 20 and/or the driver manifold assembly 16 to the housing opening 2b.

In some embodiments, the driver manifold assembly 16 may comprise a second concentric collar 22-2. A latch arm assembly 30 may, for example, be disposed (e.g., mounted and/or coupled) between the first concentric collar 22-1 and the second concentric collar 22-2. In some embodiments, the latch arm assembly 30 may comprise a plurality of latch arms (not shown in FIG. 30), each latch arm having an integral actuating tab 30c. According to some embodiments, a bolt, screw, pin, and/or assembly sleeve 30e may be inserted through axially through an annular face of the second concentric collar 22-2, through the latch arm assembly 30 (and/or through and/or retaining the latch arms and/or integral actuating tabs 30c), and through and/or coupled to the first concentric collar 22-1. The assembly sleeve 30e may, in some embodiments, function as a pivot point (and/or define a pivot axis) about with the latch arms and/or the integral actuating tabs 30c rotate.

According to some embodiments, a barbed insert 64 may be disposed at an end of the inner duct 20 and/or within the driver manifold assembly 16. In some embodiments, the barbed insert 64 may comprise an exterior annular groove 64e near or at a first end thereof, such as to house and/or retain a sealing element such as an O-ring 64f. As depicted in FIG. 30, in the case that the first end of the barbed insert 64 is inserted into the common passage 20a of the inner duct 20, the O-ring 64f may provide a fluid-tight seal with the inner sealing surface 20f of the inner duct 20. In such a manner, for example, the tube cleaning shaft 14 and/or cleaning fluid provided therewith (not shown) may be passed into and/or through the barbed insert 64. In some embodiments, the barbed insert 64 may comprise a second and/or barbed end that is engaged to couple or retain a sheath 66. According to some embodiments, the barbed insert 64 may comprise an external annular and/or radial flange 64c. The radial flange 64c may, for example, engage with and/or seat within a flexible drive shaft adaptor 200.

As depicted in FIG. 30, for example, the sheath 66 may be disposed within the flexible drive shaft adaptor 200 and the barbed insert 64 may be coupled between the flexible drive shaft adaptor 200 and the end of the inner duct 20 (e.g., with a portion of the barbed insert 64 seated within and forming a fluid-tight seal with the sealing surface 20f of the inner duct 20). In some embodiments, the flexible drive shaft adaptor 200 may comprise a yoke element 246 defining and/or comprising a conical portion 246e. According to some embodiments, the conical portion 246e may abut and/or be integrated with a driven shaft collar element 262, e.g., that retains and/or couples to the barbed insert 64. The driven shaft collar element 262 may, for example, comprise a cylindrical body portion 262a defining a threaded interior passage 262b. In some embodiments, as depicted in FIG. 30, the barbed insert 64 may be disposed in the threaded interior passage 262b. As depicted, in accordance with some embodiments, the threads of the threaded interior passage 262b may not engage with the barbed insert 64 and/or the inner duct 20. The threads of the interior passage 262b may, for example, engage with and/or couple to corresponding threads on inner ducts 20 of certain tub cleaning machines, while other machines such as depicted in FIG. 30 may utilize the latch arms to engage with and/or retain the flexible drive shaft adaptor 200.

In some embodiments, the driven shaft collar element 262 (and/or the cylindrical body portion 262a thereof) may comprise and/or define an angled front surface 262d that facilitates entry of the flexible drive shaft adaptor 200 into the driver manifold assembly 16. Upon insertion of the angled front surface 262d into the driver manifold assembly 16, for example, angled front surface 262d may engage with and urge open the latch arms, allowing insertion of the flexible drive shaft adaptor 200 into the driver manifold assembly 16, e.g., in the case that the latch arms are biased closed, such as with a spring element (not shown). According to some embodiments, the driven shaft collar element 262 (and/or the cylindrical body portion 262a thereof) may comprise and/or define an exterior radial flange 262e. The exterior radial flange 262e may, for example, accept and/or be retained by one or more latch arms (not shown in FIG. 30) such as in the case that the flexible drive shaft adaptor 200 is inserted into the driver manifold assembly 16 as shown in FIG. 30.

Figure 31:
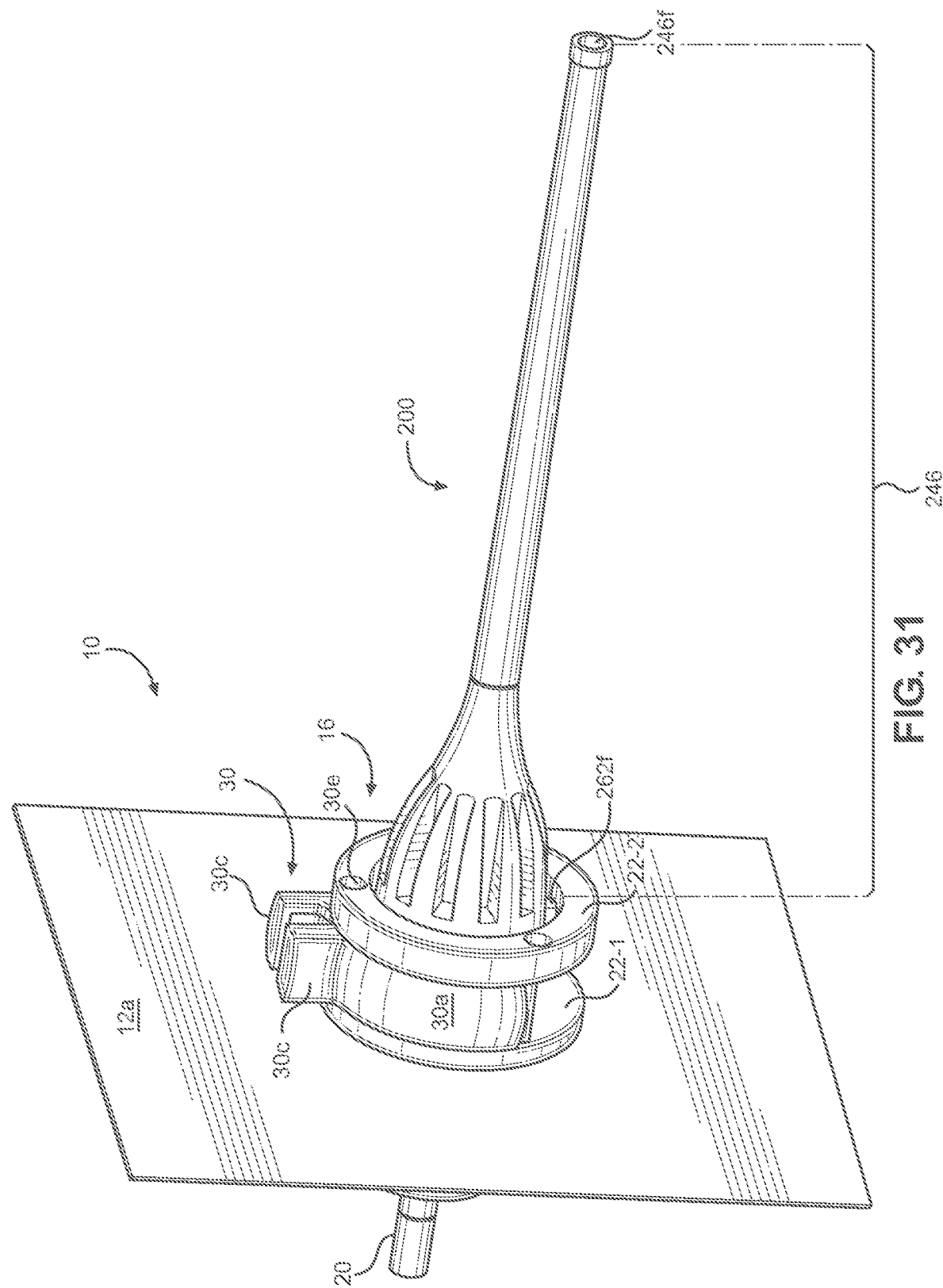
FIG. 31 is a perspective view of a drive shaft coupling according to some embodiments, illustrating coupling of a drive manifold assembly and flexible drive shaft adaptor.

Turning now to FIG. 31, a perspective view of a drive shaft coupling 10 according to some embodiments, illustrating coupling of a drive manifold assembly 16 and flexible drive shaft adaptor 200, is shown. In some embodiments, drive shaft coupling 10 may comprise a tube cleaning machine housing sidewall 12a to which an inner duct 20 and the drive manifold assembly 16 are coupled. According to some embodiments, the drive manifold assembly 16 may comprise a first concentric collar 22-1 and/or a second concentric collar 22-2. The concentric collars 22-1, 22-2 may, for example, house, retain, and/or be coupled to a latch arm assembly 30. The latch arm assembly 30 may, in some embodiments (such as depicted in FIG. 31), comprise two opposing and cooperating latch arms 30a (only one of which is clearly visible in full in FIG. 31) coupled at a pivot point by an assembly sleeve 30e, each latch arm comprising (i) at a first end disposed on a first side of the pivot point, an integral actuating tab 30c and (ii) at a second end disposed on a second side of the pivot point, an integral latch bar (not visible in FIG. 31).

According to some embodiments, the latch arms 30a (and/or the integral latch bars thereof) may be disposed to engage, retain, and/or couple to the flexible drive shaft adaptor 200. The latch bars may, for example, engage with an exterior or outer radial flange (not shown in FIG. 31) of the flexible drive shaft adaptor 200, thereby retaining the flexible drive shaft adaptor 200 in the drive manifold assembly 16 (i.e., in the retained position depicted in FIG. 31). In some embodiments, as described elsewhere herein, in the case that force is applied to move the integral actuating tabs 30c circumferentially toward each other, the latch bars may be caused to disengage with the flexible drive shaft adaptor 200 (e.g., due to a pivoting of the latch bars radially outward away from the exterior flange of the flexible drive shaft adaptor 200).

In some embodiments, the flexible drive shaft adaptor 200 may comprise a yoke element 246 defining and/or comprising a conical portion 246e and/or a tubular body portion 246d (e.g., defining and/or comprising an interior passage 246f). According to some embodiments, the flexible drive shaft adaptor 200 and/or the yoke element 246 (and/or the conical portion 246e thereof) may comprise and/or be coupled to an exterior key 262f. The exterior key 262f may, for example, comprise an integral protrusion from the flexible drive shaft adaptor 200 that interrupts the exterior radial flange thereof. In such a manner, for example, the exterior key 262f may restrict rotation of the flexible drive shaft adaptor 200 by engaging with one or more of the latch bars. In some embodiments, a plurality of exterior keys 262f may be utilized to limit the degree of rotation of the flexible drive shaft adaptor 200.

Figure 32:
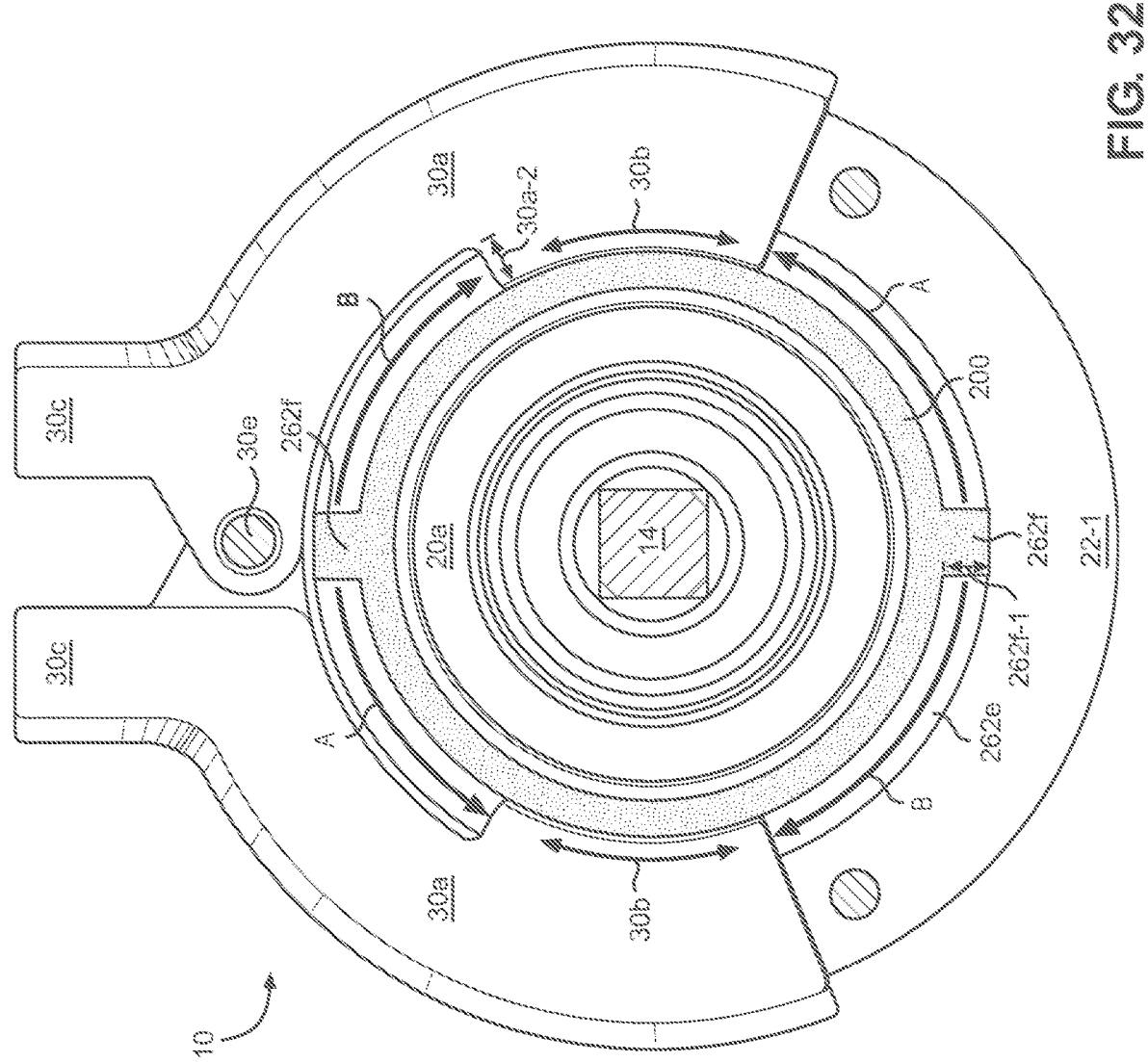
FIG. 32 is an axial view in section of a drive shaft coupling according to some embodiments, illustrating a coupling of a drive manifold assembly and flexible drive shaft adaptor.

Referring to FIG. 32 for example, an axial view in section of a drive shaft coupling 10 according to some embodiments, illustrating a coupling of a drive manifold assembly 16 and flexible drive shaft adaptor 200, is shown. The drive shaft coupling 10 may comprise, for example, a tube cleaning shaft 14 extending through a common passage 20a. In some embodiments, the drive manifold assembly may comprise an inner or first concentric collar 22-1 coupled to a plurality of latch arms 30a via an assembly sleeve 30e. According to some embodiments, the assembly sleeve 30e may comprise and/or define a pivot point about which the latch arms 30a may be pivoted to selectively engage or disengage with the flexible drive shaft adaptor 200. Each latch arm 30a may comprise, for example an integral latch bar 30b and an integral actuating tab 30c. In a closed, latched, or engaged position depicted in FIG. 32, the latch bars 30b engage with, retain, and/or couple to an exterior radial flange 262e of the flexible drive shaft adaptor 200 (e.g., preventing axial displacement or movement of the flexible drive shaft adaptor 200 with respect to the drive manifold assembly 16). In some embodiments, a spring (not explicitly shown) may be disposed at or about the pivot point, wherein the spring applies a force urging the actuating tabs 30c circumferentially away from each other, thereby urging the latch bars 30b to engage with the flexible drive shaft adaptor 200 (and/or the exterior annular flange 262e thereof). In some embodiments, force applied to urge the actuating tabs 30c circumferentially toward each other (e.g., in opposition to a spring force) may cause the latch arms 30b to move radially outward, thereby urging the latch bars 30b to disengage with the flexible drive shaft adaptor 200 (and/or the exterior annular flange 262e thereof).

According to some embodiments, each latch arm 30a may comprise an arcuate latch arm defining an interior latch arm surface 30a-1 and each integral latch bar 30b may be defined by a portion of the interior latch arm surface 30a-1 that extends radially inward from the interior latch surface 30a-1. In some embodiments, the latch arms 30b may extend radially inward from the interior latch surface 30a-1 by a latch bar height 30a-2. According to some embodiments, the latch bars 30b may engage with and restrain the flexible drive shaft adaptor 200 from axial movement. In some embodiments, the flexible drive shaft adaptor 200 may comprise a plurality of exterior keys 262f that cooperate with the latch arms 30b to limit rotation of the flexible drive shaft adaptor 200.

In some embodiments for example, the exterior keys 262f may comprise two radial protrusions disposed on opposite sides of the flexible drive shaft adaptor 200. The keys 262f may, in some embodiments, allow partial rotation in a first direction (either "A" or B" as shown in FIG. 32), of the flexible drive shaft adaptor 200 with respect to the latch arms 30a (when engaged thereby). The partial rotation may end when the exterior keys 262f engage with the integral latch bars 30b, thereby preventing further rotation in the first direction (either "A" or B" as shown in FIG. 32). While two keys 262f are depicted in FIG. 32, fewer or more keys 262f may be utilized, as desired. In some embodiments, the keys 262f may protrude radially from the flexible drive shaft adaptor 200 by a key height 262f-1. According to some embodiments, the key height 262f-1 may be equivalent to the latch bar height 30a-2 and/or to the height (or depth) of the exterior radial flange 262e.

III. Conclusion

Various changes may be made to the structure embodying the principles of the invention. The foregoing embodiments are set forth in an illustrative and not in a limiting sense. The scope of the invention is defined by the claims appended hereto.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. A flexible drive shaft adapter, comprising:
a driven shaft collar element comprising a generally cylindrical body portion defining an angled front surface sloping radially inward to a toe at a first end of the flexible drive shaft adaptor, an exterior radial flange disposed at the heel of the angled front surface, and an exterior key protruding radially outward;
a yoke element integral with and disposed adjacent to the driven shaft collar element, the yoke element comprising a conical portion extending axially from a wide end adjacent to the driven shaft collar element to a narrow end distal from the driven shaft collar element, and an elongate tubular body portion extending from the narrow end of the conical portion to a second end of the flexible drive shaft adaptor;
wherein the flexible drive shaft adaptor defines an interior passage extending axially from the first end of the flexible drive shaft adaptor, through the driven shaft collar element and the yoke element, to the second end of the flexible drive shaft adaptor.

2. The flexible drive shaft system of claim 1, wherein the exterior key comprises two exterior keys disposed at opposing sides of the driven shaft collar element.

3. The flexible drive shaft system of claim 1, wherein the exterior key comprises a first end disposed to abut the heel of the exterior radial flange and a second end terminating at the conical portion of the yoke element.

4. The flexible drive shaft system of claim 1, wherein the conical portion of the yoke element comprises a plurality of axially elongated ribs extending radially outward therefrom.

5. The flexible drive shaft system of claim 1, further comprising a flexible drive shaft disposed within the interior passage.

6. The flexible drive shaft system of claim 1, further comprising a pressurized fluid disposed within the interior passage.

7. The flexible drive shaft system of claim 1, further comprising a tube cleaning drive shaft coupling comprising a housing and a latch arm assembly coupled to the housing, the latch arm assembly, comprising:
two opposing and cooperating latch arms coupled at a pivot point, each latch arm comprising (i) at a first end disposed on a first side of the pivot point, an integral actuating tab and (ii) at a second end disposed on a second side of the pivot point, an integral latch bar disposed to engage the exterior radial flange of the driven shaft collar element, thereby coupling the driven shaft collar element to the housing, wherein force applied to move the actuating tabs circumferentially toward each other causes the latch bars to disengage with the exterior radial flange of the driven shaft collar element.

8. The flexible drive shaft system of claim 7, wherein each latch arm defines an interior latch arm surface and each interior latch arm surface comprises a respective integral latch bar defined by a portion of the interior latch arm surface that extends radially inward from the interior latch surface.

9. The flexible drive shaft system of claim 8, wherein at least one of the integral latch bars engages with and restrains the flexible drive shaft adaptor from axial movement.

10. The flexible drive shaft system of claim 8, wherein at least one of the latch arms engages with the exterior key to limit rotation of the flexible drive shaft adaptor.

11. A drive shaft system, comprising:
a single-piece, integral flexible drive shaft adaptor, comprising:
a driven shaft collar element comprising a generally cylindrical body portion defining an angled front surface sloping radially inward to a toe at a first end of the flexible drive shaft adaptor, an exterior radial flange disposed at the heel of the angled front surface, and an exterior key protruding radially outward;
a yoke element formed adjacent to the driven shaft collar element, the yoke element comprising a conical portion extending axially from a wide end adjacent to the driven shaft collar element to a narrow end distal from the driven shaft collar element, and an elongate tubular body portion extending from the narrow end of the conical portion to a second end of the flexible drive shaft adaptor;
wherein the flexible drive shaft adaptor defines an interior passage extending axially from the first end of the flexible drive shaft adaptor, through the driven shaft collar element and the yoke element, to the second end of the flexible drive shaft adaptor;
a tube cleaning drive shaft coupling comprising a housing and a latch arm assembly coupled to the housing, the latch arm assembly, comprising:
two opposing and cooperating latch arms coupled at a pivot point, each latch arm comprising (i) at a first end disposed on a first side of the pivot point, an integral actuating tab and (ii) at a second end disposed on a second side of the pivot point, an integral latch bar disposed to engage the exterior radial flange of the driven shaft collar element, thereby coupling the driven shaft collar element to the housing, wherein force applied to move the actuating tabs circumferentially toward each other causes the latch bars to disengage with the exterior radial flange of the driven shaft collar element;

wherein each latch arm defines an interior latch arm surface and each interior latch arm surface comprises a respective integral latch bar defined by a portion of the interior latch arm surface that extends radially inward from the interior latch surface, and wherein at least one of the latch arms engages with the exterior key to limit rotation of the flexible drive shaft adaptor.

* * * * *